United States Patent
Kobayashi et al.

[11] Patent Number: 5,968,679
[45] Date of Patent: *Oct. 19, 1999

[54] MAGNETIC RECORDING MEDIUM AND METHOD OF MANUFACTURING THE SAME

[75] Inventors: Masato Kobayashi, Tokyo; Keiji Moroishi; Jun-ichi Horikawa, both of Yamanashi; Osamu Nozawa, Tokyo, all of Japan

[73] Assignee: Hoya Corporation, Tokyo, Japan

[*] Notice: This patent is subject to a terminal disclaimer.

[21] Appl. No.: 08/758,015

[22] Filed: Nov. 27, 1996

[30] Foreign Application Priority Data

Nov. 28, 1995 [JP] Japan .................................. 7-309606
Nov. 28, 1995 [JP] Japan .................................. 7-309607

[51] Int. Cl.$^6$ ............................................... G11B 5/66
[52] U.S. Cl. ........................... 428/694 TS; 428/694 T; 428/694 TM; 428/332; 428/336
[58] Field of Search .................. 428/694 T, 694 TS, 428/694 TM, 332, 336

[56] References Cited

U.S. PATENT DOCUMENTS

| | | | |
|---|---|---|---|
| 4,647,494 | 3/1987 | Meyerson et al. | 428/216 |
| 4,652,499 | 3/1987 | Howard | 428/641 |
| 4,749,628 | 6/1988 | Ahlert et al. | 428/690 |
| 4,833,020 | 5/1989 | Shiroishi et al. | 428/336 |
| 5,232,566 | 8/1993 | Edmonson et al. | 204/192.1 |
| 5,302,434 | 4/1994 | Doerner et al. | 428/64 |
| 5,552,204 | 9/1996 | Ahlert et al. | 428/65.5 |
| 5,569,506 | 10/1996 | Jahnes et al. | 428/65.3 |
| 5,605,733 | 2/1997 | Ishikawa et al. | 428/65.3 |
| 5,693,426 | 12/1997 | Lee et al. | 428/611 |
| 5,824,427 | 10/1998 | Kobayashi et al. | 428/694 TS |

FOREIGN PATENT DOCUMENTS 2 210614  8/1990  Japan .................................. G11B 5/66

OTHER PUBLICATIONS

IEEE Transactions on Magnetics, vol. MAG–3, No. 3 (1967), pp. 205–207.

Primary Examiner—Nam Nguyen
Assistant Examiner—Steven H. VerSteeg
Attorney, Agent, or Firm—Sughrue, Mion, Zinn, Macpeak & Seas, PLLC

[57] ABSTRACT

In a magnetic recording medium having an underlying film of a body-centered-cubic (bcc) CrV-based alloy and a magnetic film of a hexagonal close-packed (hcp) CoPtCr-based alloy deposited on the underlying film, a difference between a crystal lattice plane distance $d_{(002)}$ of (002) planes in the hcp alloy of the magnetic film and another crystal lattice plane distance $d_{(110)}$ of (110) planes in the bcc alloy of the nonmagnetic film is given by subtracting $d_{(110)}$ from $d_{(002)}$ and falls within a range between 0.002 and 0.032 angstrom. Preferably, the difference $d_{(002)}-d_{(110)}$ is present between 0.014 and 0.030 angstrom only a single pair of the underlying film and the magnetic film may be included in the magnetic recording medium or plural pairs of the underlying film and the magnetic film may be included in the magnetic recording medium.

27 Claims, 4 Drawing Sheets

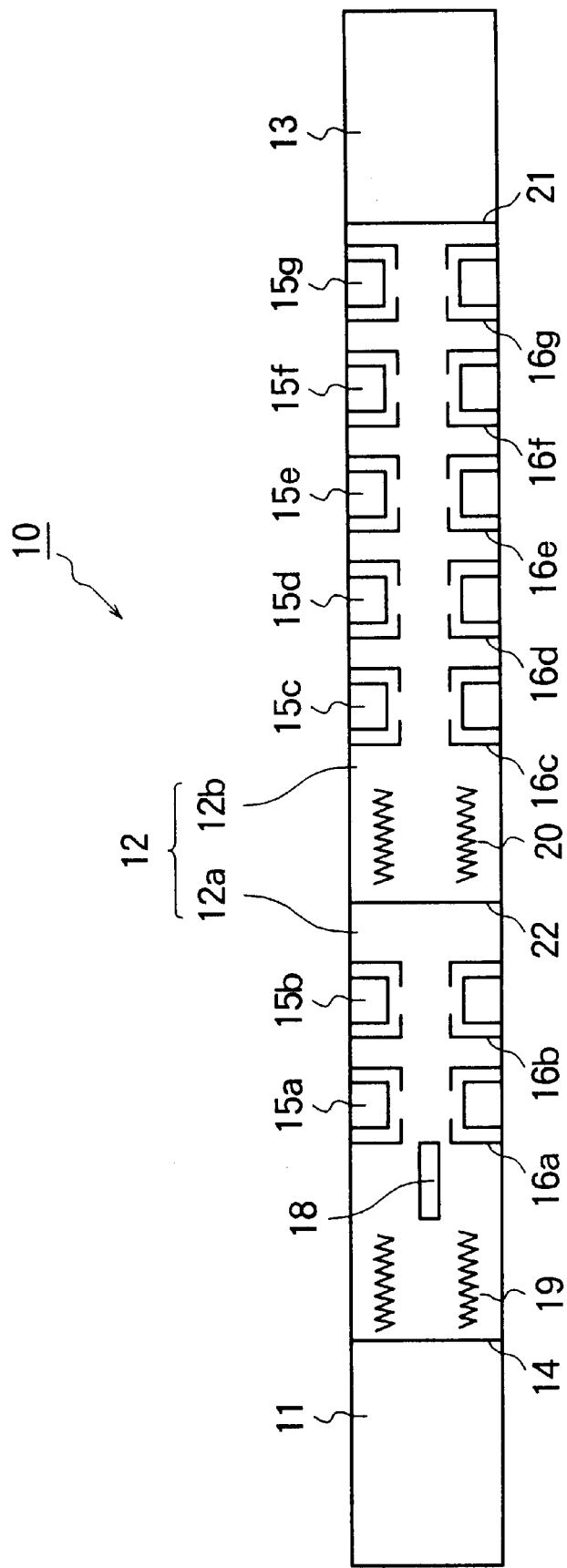

MAGNETIC RECORDING MEDIUM AND METHOD OF MANUFACTURING THE SAME

BACKGROUND OF THE INVENTION

The present invention relates to a magnetic recording medium, such as a magnetic disk and a magnetic tape, and a method of manufacturing the same.

Magnetic recording technology has a long history and is based on established techniques. The development of an information-based society in recent years has accelerated the development of a magnetic recording medium which has a higher density with improved properties. Such technology has thus been important more and more.

In particular, a thinner recording layer has been used for a higher recording density in the field of magnetic disks (e.g., hard disks and floppy disks) which serve as peripheral storage devices. The age of thin film medium using a magnetic thin film has been just beginning. In this event, important challenges are how to ensure the reliability of data stored thereon with a higher recording density and how to make such media suitable for mass-production at a low manufacturing cost.

It is known that a higher coercive force is achieved by using chromium as the underlying layer or film of a magnetic recording medium which has a magnetic layer of CoNiCr alloy or CoCrTa alloy (see, for example, IEEE Transactions on Magnetics Vol. MAG-3, No. 3 (1967), pages 205–207).

However, the magnetic CoPt alloy layer degrades orientation along the C-axis when it is combined with the underlayer of chromium (Cr) alone. This is because a crystal lattice constant of the magnetic CoPt-based alloy layer is greater than a crystal lattice constant of the conventional magnetic layer of the CoNiCr alloy or the CoCrTa alloy. As a result, the magnetic CoPt-based layer is not completely matched in atomic alignment with the underlying layer of the single component of Cr. Thus, this adversely affects the orientation of the C-axis.

In order to overcome this problem, U.S. Pat. No. 4,652,499 which is issued to Howard proposes to add a second or different metal to the Cr underlayer to improve the lattice constant. The orientation along the C-axis can be improved for the magnetic layer in film interface or boundary by means of changing the lattice constant of the alloy underlayer by addition of the different metal to the Cr alloy. This brings about an improvement of the coercive force or coercivity and the squareness.

The present inventors have found, as a result of detailed consideration, that the resultant recording medium has a significantly larger noise as a result of the addition of the different metal to the underlying Cr layer.

Another thin film recording medium is disclosed in Japanese Unexamined Patent Publication No. Hei 2-210614, namely, 210614/1990. The disclosed thin film recording medium consists of a magnetic layer of a cobalt-platinum (CoPt) based alloy having a high coercive force. In the thin film recording medium, the magnetic layer is divided into two magnetic films with a nonmagnetic intermediate film of chromium (Cr) interposed therebetween. This structure is helpful to reduce a noise during reproduction. More specifically, the resultant magnetic layer is composed of a first magnetic CoPt film, a nonmagnetic Cr film, and a second magnetic CoPt film, which are stacked in this order. It is also known that an underlying layer of Cr provides a favorable crystal structure for the magnetic CoPt film when placed under the thin magnetic film.

However, the above-mentioned magnetic recording medium which comprises the underlying Cr layer, the first magnetic CoPt film, the nonmagnetic intermediate Cr film, and the second magnetic CoPt film exhibits insufficient or unsatisfactory properties for a recording medium, such as coercive force, a reproduction output (product of residual magnetization and film thickness), and a signal-to-noise (S/N) ratio when it is manufactured with an in-line sputtering apparatus.

In addition, it has been found out that the magnetic recording medium having the above-mentioned structure is liable to a reduction in coercive force as compared with a single magnetic recording layer and is insufficient in over-writing properties.

SUMMARY OF THE INVENTION

It is an object of the present invention to provide a magnetic recording medium which has improved properties, such as coercive force (Hc), a reproduction output, and a signal-to-noise (S/N) ratio.

It is another object of the present invention to provide a magnetic recording medium which has good over-writing properties and which can reduce noise.

It is still another object of the present invention to provide a magnetic recording medium which has a magnetic layer divided into a plurality of magnetic films with a nonmagnetic intermediate film interposed therebetween and which exhibits improved magnetic properties.

It is yet another object of the present invention to provide a method of manufacturing a magnetic recording medium, which can control crystal lattice plane distances (simply called crystal lattice plane distances herein-under) of both an underlayer of CrV and a magnetic film of a CoPt-based alloy so as to optimize the magnetic properties of the magnetic recording medium.

A magnetic recording medium to which the present invention is applicable comprises a magnetic film which includes at least both Co and Pt and which is specified by a hexagonal close-packed (hcp) crystal structure having (002) planes remote from each other by a first crystal lattice plane distance $d_{(002)}$ and an underlying film which includes Cr and V, which is contacted with the magnetic film, and which is specified by a body-centered cubic (bcc) crystal structure having (110) planes distant from each other by a second crystal lattice plane distance $d_{(110)}$. According to an aspect of the present invention, the first and the second crystal lattice plane distances $d_{(002)}$ and $d_{(110)}$ have a difference which falls within a range between 0.002 and 0.032 angstrom. Specifically, the difference is given by subtracting the second crystal lattice plane distance $d_{(110)}$ by the first crystal lattice plane distance $d_{(002)}$.

According to another aspect of the present invention, a magnetic recording medium comprises a substrate, an underlying layer of a nonmagnetic material, and a lamina on the underlying layer. The lamina comprises a first magnetic film which is brought into contact with the underlying layer, a nonmagnetic intermediate film which is deposited on the first magnetic film and which is formed by a CrV based alloy and specified by a body-centered cubic (bcc) crystal structure having (110) planes distant from each other by a crystal lattice plane distance $d_{(110)}$, and a second magnetic film which is deposited on the nonmagnetic intermediate film which includes Co and Pt as primary components and which is specified by a hexagonal close-packed (hcp) crystal structure having (002) planes remote from each other by a crystal lattice plane distance $d_{(002)}$. The crystal lattice plane distances $d_{(002)}$ and (110) have a difference which is given by $d_{(002)}-d_{(110)}$ and which falls within a range between 0.002 and 0.032 angstrom. It has been confirmed that the coercivity (Hc) and the S/N ratio are deteriorated when the difference $d_{(002)}-d_{(110)}$ is less than 0.002 angstrom and is greater than 0.032 angstrom. Preferably, the difference $d_{(002)}-d_{(110)}$ may be restricted to a range between 0.014 and 0.030 angstrom in order to obtain a higher S/N ratio.

According to still another aspect of the present invention, a method is for use in manufacturing a magnetic recording medium as mentioned above and comprises the step of successively depositing, by sputtering, a nonmagnetic underlying film of a CrV based alloy and a magnetic film of a CoPt based alloy on the nonmagnetic underlying film, at a temperature range between 250 and 425° C. under an argon gas pressure between 0.5 and 10 mTorr. Preferably, the temperature falls within a range between 300 and 400° C. while the argon gas pressure falls within a range between 1 and 8 mTorr.

In addition, the first magnetic film also includes Co and Pt as primary components and is specified by a hexagonal close-packed (hcp) crystal structure having (002) planes remote from each other by an additional crystal lattice plane distance $d_{(002)}$. In this event, the underlying layer may include an additional nonmagnetic film of a CrV based alloy which is contacted with the first magnetic film and which is specified by a body-centered cubic (bcc) crystal structure having (110) planes distant from each other by a subsidiary crystal lattice plane distance $d_{(110)}$. The additional and the subsidiary crystal lattice plane distances $d_{(002)}$ and $d_{(110)}$ is given by a difference which is given by $d_{(002)}-d_{(110)}$ which falls within a range between 0.002 and 0.032 angstrom.

The magnetic film of a CoPt-based alloy may be formed by a CoPtCr alloy which includes 4–20 at. % of Pt and 3–30 at. % of Cr and may be preferably combined with the underlying film or the nonmagnetic intermediate film of a CrV alloy which includes 4–40 at. % of V and preferably, 10–20 at. % of V. With this combination of the magnetic film and the underlying film or the nonmagnetic intermediate film, uniform crystallization can be accomplished in the magnetic film and the underlying film or the nonmagnetic intermediate film because they have uniform particle sizes. Moreover, such a combination makes it possible to control the difference $d_{(002)}-d_{(110)}$ within the above-mentioned range.

The underlying layer which includes the underlying film of the CrV-based alloy brought into contact with the magnetic film may also include at least one nonmagnetic underlying film situated under and contacted with the underlying film of the CrV-based alloy. The nonmagnetic underlying film may be preferably composed of a metal, such as Cr, Ti, Ta, Zr, or the like which has a body-centered and close-packed crystal structure and which has uniform crystal particles and good crystallization. Such a nonmagnetic underlying film of the body-centered and close-packed crystal structure may have a thickness between 100 and 1000 angstroms to obtain the uniform particle sizes. Preferably, the thickness of the nonmagnetic underlying film may be between 100 and 800 angstroms in view of higher coercivity and a higher S/N ratio. In addition, the ratio of the CrV underlying film to the nonmagnetic underlying film of the body-centered and close-packed crystal structure may fall within a range between 0.05 and 0.5 in order to improve the coercivity and the S/N ratio.

Furthermore, a different nonmagnetic underlying film may be located between the substrate and the above-mentioned nonmagnetic underlying film of the body-centered and close-packed crystal structure and may be formed by Al, Ti, Zr, or the like. The different nonmagnetic underlying film may have a thickness falling within a range between 10 and 100 angstroms. The range may be determined by uniformity of the particle sizes included in the nonmagnetic underlying film of the body-centered and close-packed crystal structure. In the light of the coercivity and the S/N ratio, the thickness of the different nonmagnetic underlying film may be restricted to a range between 30 and 80 angstroms.

BRIEF DESCRIPTION OF THE DRAWING

FIG. 4 is a plan view of an in-line sputtering apparatus for use in manufacturing the magnetic recording medium illustrated in FIG. 3.

DESCRIPTION OF THE PREFERRED EMBODIMENTS

First Embodiment

Figure 1:
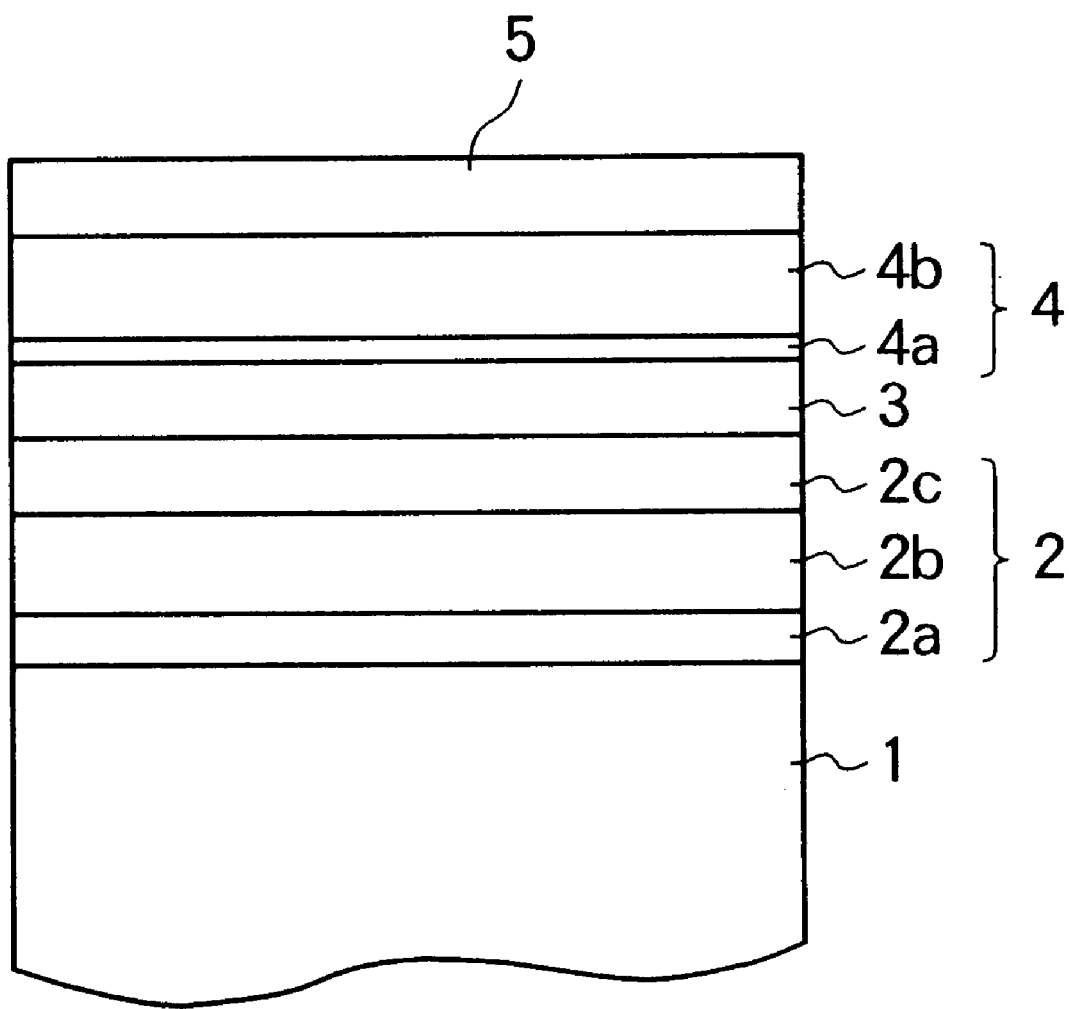
FIG. 1 is a sectional view of a magnetic recording medium according to a first embodiment of the present invention.

First Example of the First Embodiment:

Referring to FIG. 1, a magnetic recording medium according to a first embodiment of the present invention is structured as a first example by a glass substrate 1, an underlayer 2 on the glass substrate 1, and a single magnetic film 3 on the underlayer 2. On the magnetic film 3, a protection layer 4 and a lubricant layer 5 are successively deposited by the use of an in-line sputtering apparatus.

More specifically, the glass substrate 1 is formed by aluminosilicate glass and is subjected to mirror finish to provide a mirror finished surface which has a roughness Ra of 50 angstroms. The underlayer 2 is formed by a first thin film 2a of Al deposited on the glass substrate 1, a second thin film 2b of Cr on the first thin film 2a, and a third thin film 2c of CrV on the second thin film 2b. The first thin film 2a of Al is deposited to a thickness of 50 angstroms while the second thin film 2b of Cr is 600 angstroms thick. Moreover, the third thin film 2c of Crv is deposited to a thickness of 50 angstroms and has a composition ratio of 96 at. % of Cr and 4 at. % of V.

The illustrated magnetic film 3 is formed by an alloy of CoPtCr and is deposited to a thickness of 500 angstroms. In addition, the magnetic film 3 comprises 78 at. % of Co, 11 at. % of Pt, and 11 at. % of Cr.

In the example illustrated, the protection layer 4 is composed of a first protection film 4a deposited on the magnetic film 3 and a second protection film 4b on the first protection film 4a. The first protection film 4a is formed by a Cr film of 50 angstroms and serves as a chemical protection film for the magnetic film 3 while the second protection film 4b is formed by a silicon oxide film of 160 angstroms thick in which hard fine grains are dispersed. The second protection film 4b serves to provide wear resistance.

The lubricant layer 5 is formed by perfluoropolyether (PFPE) and is operable to mitigate a contact with a magnetic head.

Figure 2:
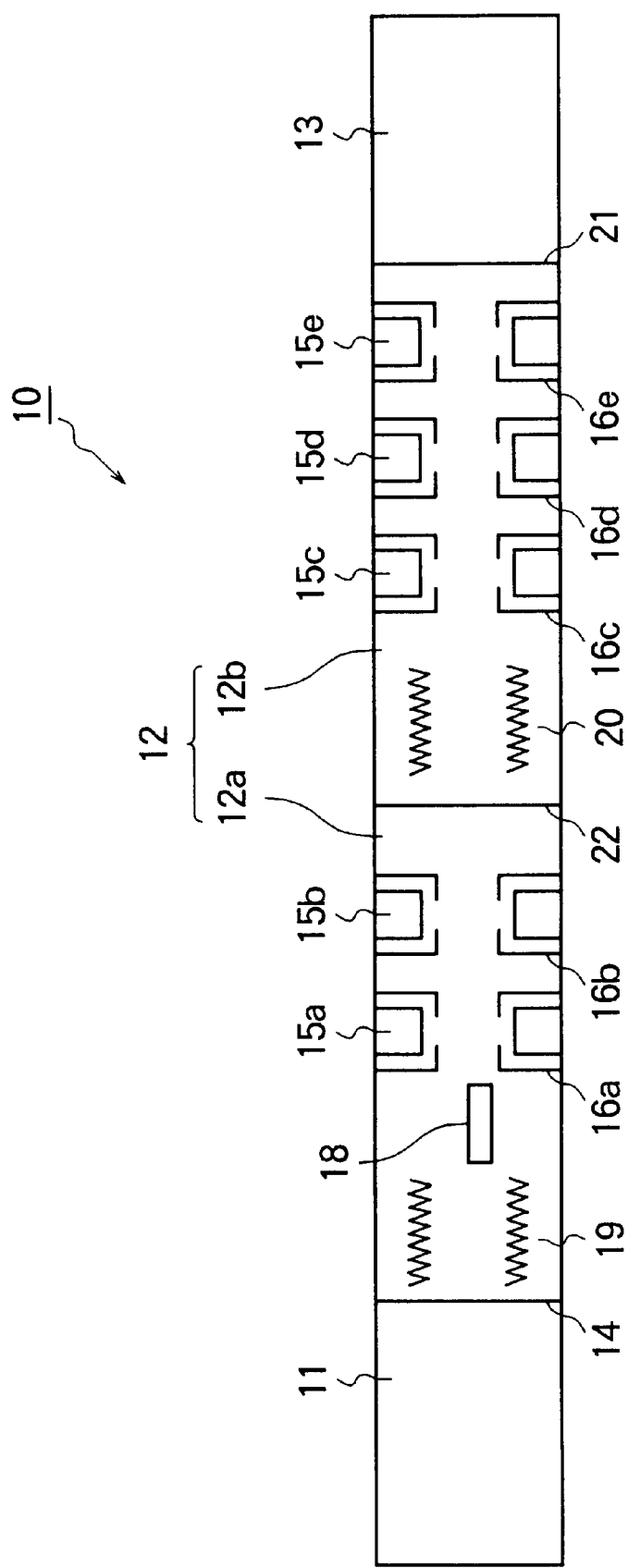
FIG. 2 is a plan view of an in-line sputtering apparatus for use in manufacturing the magnetic recording medium illustrated in FIG. 1.

Referring to FIG. 2, description will be now directed to an in-line sputtering apparatus which is used to manufacture the magnetic recording medium illustrated in FIG. 1. The in-line sputtering apparatus 10 comprises a pallet load chamber (namely, a loadlock chamber) 11, a sputtering chamber (vacuum chamber) 12, and a pallet unload chamber 13 all of which are connected in line to one another through partition walls 14 and 21. The illustrated sputtering chamber 12 is divided into a first sputtering chamber 12a and a second sputtering chamber 12b coupled to each other through a partition 22.

Practically, each pallet 18 is loaded with a plurality of glass substrates which are directed upwards and downwards of FIG. 2. Under the circumstances, when the pallet 18 is introduced into the pallet load chamber 11, the pallet load chamber 11 is exhausted from an atmospheric pressure to a degree of a vacuum which is similar to that of the first and the second sputtering chamberi 12a and 12b. Thereafter, the partition wall 14 is opened to introduce the pallet 18 into the first sputtering chamber 12a.

Within the first sputtering chamber 12a, the glass substrates mounted on the pallet 18 is heated by a lamp heater 19 at a temperature of 300° C. for one minute. Then, the pallet 18 is transferred or transported at a transfer speed of 1.2 m/min. and allowed to successively pass between targets 15a and 16a of Al and thereafter between the targets 15b and 16b of Cr. Since the targets 15a and 16a and the following targets 15b and 16b are put in discharge states with an argon gas kept at a pressure of 5 mTorr, the first thin films 2a and the second thin films 2b are deposited on both surfaces of each glass substrate 1 mounted on the pallet 18. The targets 15a and 16a are supplied with electric power of 300 watts while the targets 15b and 16b are supplied with electric power of 1.5 kilowatts.

Next, the pallet 18 is transported through the partition 22 to the second sputtering chamber 12b which has a heater 20. The transported pallet 18 is heated by the heater 20 again to a temperature of 375° C. for one minute within the second sputtering chamber 12b. Within the second sputtering chamber 12b, CrV targets 15c and 16c, CoPtCr targets 15d and 16d, and Cr targets 15e and 16e are successively arranged in a transportation direction of the pallet 18 and are put into discharged states. The second sputtering chamber 12b is filled with an argon gas of 1.3 mTorr. Under the circumstances, the pallet 18 is allowed to successively pass between the CrV targets 15c and 16c, the CoPtCr targets ld and 16d, and the Cr targets 15e and 16e at a transfer speed of 1.2 m/min. In this event, the CrV targets 15c and 16c, the CoPtCr targets 15d and 16d, and the Cr targets 15e and 16e are supplied with electric power of 500 watts, 1.2 kilowatts, and 500 watts, respectively. In addition, the first and the second sputtering chambers 12a and 12b are kept at a pressure which is equal to or less than $5 \times 10^{-6}$ Torr.

Consequently, the third thin film 2c, the magnetic film 3, and the first protection film 4a are successively deposited to the thicknesses of 50, 500, and 50 angstroms, respectively, as mentioned in conjunction with FIG. 1.

After completion of the deposition based on the sputtering, hydrophilication is conducted by washing the first protection Cr film 4a by the use of isopropyl alcohol (IPA). Thereafter, the second protection film 4b is formed on the first protection film 4a by immersing the above-mentioned substrate within an organic silicon compound solution (a solution of water, IPA, and tetraethoxysilane) in which fine particles (a particle size of 100 angstroms) of silica are dispersed.

Finally, the lubricant layer 5 is formed on the second protection film 4b by a dipping process using perfluoropolyether (PFPE). Thus, the magnetic recording medium illustrated in FIG. 1 is manufactured as the first example by using the in-line sputtering apparatus shown in FIG. 2. The first example may be considered as a magnetic disk without loss of generality.

The magnetic disk so obtained has been measured in connection with coercive force, a product Mrδ (simply called the product Mrδ) of residual magnetization and thickness, and a signal-to-noise (S/N) ratio by conducting a running test with a magnetic head floating height kept at less than 0.075 μm. The results are shown in Table 1-1 below. Table 1-1 also shows a composition and a thickness of the third thin film 2c of CrV, a heating temperature of a substrate (abbreviated to a substrate temperature), and an Ar gas pressure together with the coercive force, the product Mrδ, and the S/N ratio.

TABLE 1-1

| Example | Magnetic Film (3) Composition 500 Å (at %) | 3rd Thin Film (2c) Composition (at %) | 3rd Thin Film (2c) Thickness (Å) | Substrate Temperature (° C.) | Ar Gas Pressure (mTorr) | Hc (Oe) | Mrδ (memu /cm$^2$) | S/N Ratio (dB) | $d_{(002)}$-$d_{(110)}$ (Å) |
|---|---|---|---|---|---|---|---|---|---|
| 1 | Co$_{78}$Pt$_{11}$Cr$_{11}$ | Cr$_{96}$V$_4$ | 50 | 375 | 1.3 | 1920 | 2.11 | 31.5 | +0.028 |
| 2 | " | " | 100 | 375 | 1.3 | 1960 | 2.07 | 31.7 | +0.027 |
| 3 | " | " | 50 | 300 | 1.3 | 1810 | 2.10 | 31.0 | +0.032 |
| 4 | " | " | 50 | 375 | 5.0 | 1850 | 2.10 | 31.2 | +0.032 |
| 5 | " | Cr$_{90}$V$_{10}$ | 50 | 375 | 1.3 | 2010 | 2.19 | 32.9 | +0.025 |
| 6 | " | " | 100 | 375 | 1.3 | 2040 | 2.10 | 33.2 | +0.024 |
| 7 | " | " | 20 | 375 | 1.3 | 1950 | 2.08 | 33.0 | +0.026 |
| 8 | " | " | 50 | 300 | 1.3 | 1910 | 2.10 | 32.0 | +0.028 |
| 9 | " | " | 50 | 375 | 5.0 | 1900 | 2.13 | 32.2 | +0.029 |
| 10 | " | Cr$_{80}$V$_{20}$ | 50 | 375 | 1.3 | 1970 | 2.19 | 32.5 | +0.015 |
| 11 | " | " | 100 | 375 | 1.3 | 2000 | 2.09 | 32.8 | +0.014 |
| 12 | " | " | 20 | 375 | 1.3 | 1960 | 2.03 | 32.8 | +0.015 |
| 13 | " | " | 50 | 300 | 1.3 | 1900 | 2.10 | 32.4 | +0.018 |
| 14 | " | " | 50 | 375 | 5.0 | 1900 | 2.10 | 32.3 | +0.020 |

TABLE 1-2

| Example | Magnetic Film (3) Composition 500 Å (at %) | 3rd Thin Film (2c) Composition (at %) | Thickness (Å) | Substrate Temperature (° C.) | Ar Gas Pressure (mTorr) | Hc (Oe) | Mrδ (memu/cm²) | S/N Ratio (dB) | $d_{(002)}$-$d_{(110)}$ (Å) |
|---|---|---|---|---|---|---|---|---|---|
| 15 | $Co_{78}Pt_{11}Cr_{11}$ | $Cr_{70}V_{30}$ | 50 | 375 | 1.3 | 1920 | 2.15 | 31.4 | +0.006 |
| 16 | " | " | 100 | 375 | 1.3 | 1950 | 2.20 | 31.6 | +0.007 |
| 17 | " | " | 20 | 375 | 1.3 | 1920 | 2.08 | 31.6 | +0.006 |
| 18 | " | " | 50 | 300 | 1.3 | 1820 | 2.10 | 31.2 | +0.012 |
| 19 | " | " | 50 | 375 | 5.0 | 1850 | 2.10 | 31.2 | +0.010 |
| 20 | " | $Cr_{60}V_{40}$ | 50 | 375 | 1.3 | 1880 | 2.10 | 31.1 | +0.002 |
| 21 | " | " | 50 | 300 | 1.3 | 1800 | 2.20 | 31.2 | +0.005 |
| 22 | " | " | 50 | 375 | 5.0 | 1850 | 2.18 | 31.1 | +0.004 |
| 23 | " | $Cr_{93}V_4Zr_3$ | 50 | 375 | 1.3 | 2020 | 2.22 | 33.7 | +0.027 |
| 24 | " | $Cr_{86}V_{12}Zr_2$ | 50 | 375 | 1.3 | 2080 | 2.24 | 34.2 | +0.024 |
| 25 | " | $Cr_{71}V_{24}Zr_5$ | 50 | 375 | 1.3 | 2040 | 2.20 | 33.6 | +0.015 |

Herein, it is to be noted that the magnetic film 3 of CoPtCr Is structured by a hexagonal-close-packed (hcp) crystal which has (002) planes and a first crystal lattice plane distance $d_{(002)}$ between the (002) planes while the third thin film or third underlayer 2c of CrV which is brought into contact with the magnetic film 3 is structured by a body-cubic-centered crystal which has (110) planes and a second crystal lattice plane distance $d_{(110)}$. In Table 1-1, a difference obtained by subtracting the second crystal lattice plane distance $d_{(110)}$ from the first crystal lattice plane distance $d_{(002)}$ and $d_{(110)}$.

On evaluating the S/N ratio, a thin film head has been used which has a floating height of 0.060 μm. In this event, recording and reproduction outputs were measured at a track recording density of 80 kfci with a relative speed kept at 5.4 m/s between the thin film head and the magnetic disk. In addition, a noise spectrum of the magnetic disk was measured during signal recording and reproduction of the magnetic disk by a spectrum analyzer which had a carrier frequency and a measuring bandwidth which were set to 8.5 MHz and 20 MHz, respectively. The thin film head used in the measurement had a coil turn number of 60, a track width of 4.8 μm, and a head gap length of 0.25 μm. As shown in Table 1-1, the first example 1 has the difference between $d_{(002)}$ and $d_{(110)}$ which is equal to +0.028 angstrom.

Second through Twenty-Fifth Examples 2 to 25:

Second through twenty-second examples 2 to 22 according to the first embodiment of the present invention are enumerated along with the first example 1 in Tables 1-1 and 1-2. Herein, the second through the twenty-second examples 2 to 22 are manufactured in a manner similar to the first example except that the compositions and the thicknesses of the third thin films or third underlayers 2c are changed together with the substrate temperatures and the argon gas pressures.

Each of the twenty-third through the twenty-fifth examples 23 to 25 according to the first embodiment of the present invention is specified by the first thin film, namely, the first underlayer 2a of Al which has the thickness of 50 angstroms and the roughness Ra of 10 angstroms and which is deposited by sputtering. In addition, each of the twenty-third through the twenty-fifth examples 23 to 25 has the third thin film, namely, the third underlayer 2c of a CrVZr alloy which has the thickness of 50 angstroms and which has the composition shown in Tables 1-1 and 1-2. Furthermore, the protection layer 4 in each of the twenty-third through the twenty-fifth examples 23 to 25 is formed by a single film of carbon which is deposited by sputtering.

The second through the twenty-fifth examples 2 to 25 were manufactured as magnetic disks and subjected to running tests with the floating height of a magnetic head kept at less than 0.075 μm. All of the examples 2 to 25 exhibited excellent results. In addition, the coercive force (Hc), the product (Mrδ), and the S/N ration were also evaluated in the manner mentioned in conjunction with the first example 1.

As shown in Tables 1-1 and 1-2, it has been found out that the differences between the crystal lattice plane distance $d_{(002)}$ of the magnetic film 3 of CoPtCr and the crystal lattice plane distance $d_{(110)}$ of the third thin film 2c of Crv fall within a range between 0.002 and 0.032 angstrom in the first through the twenty-fifth examples 1 to 25.

Comparative Examples 1 through 6:

Provision has been made about first through sixth comparative examples 1 to 6 so as to compare magnetic characteristics of the first through the sixth comparative examples 1 to 6 with those of the first through the twenty-fifth examples 1 to 25 according to he present invention. In Table 2, the magnetic characteristics of the first through the sixth comparative examples 1 to 6 are enumerated for comparison.

TABLE 2

| Comparative Example | Magnetic Film (3) Composition 500 Å (at %) | 3rd Thin Film (2c) Composition (at %) | Thickness (Å) | Substrate Temperature (° C.) | Ar Gas Pressure (mTorr) | Hc (Oe) | Mrδ (menu/cm²) | S/N Ratio (dB) | $d_{(002)}$-$d_{(110)}$ (Å) |
|---|---|---|---|---|---|---|---|---|---|
| 1 | $Co_{78}Pt_{11}Cr_{11}$ | Cr | 50 | 375 | 1.3 | 1650 | 1.89 | 28.5 | +0.035 |
| 2 | " | $Cr_{50}V_{50}$ | 50 | 375 | 1.3 | 1870 | 2.11 | 28.6 | −0.015 |
| 3 | " | $Cr_{96}V_4$ | 50 | 220 | 1.3 | 1720 | 2.19 | 28.8 | +0.037 |

TABLE 2-continued

| Comparative Example | Magnetic Film (3) Composition 500 Å (at %) | 3rd Thin Film (2c) Composition (at %) | 3rd Thin Film (2c) Thickness (Å) | Substrate Temperature (° C.) | Ar Gas Pressure (mTorr) | Hc (Oe) | Mrδ (menu/cm²) | S/N Ratio (dB) | $d_{(002)}$–$d_{(110)}$ (Å) |
|---|---|---|---|---|---|---|---|---|---|
| 4 | " | " | 50 | 375 | 18.0 | 1920 | 1.80 | 28.3 | +0.039 |
| 5 | " | $Cr_{60}V_{40}$ | 50 | 430 | 1.3 | 1880 | 1.78 | 28.0 | −0.006 |
| 6 | " | " | 50 | 375 | 0.2 | 1730 | 2.15 | 27.6 | −0.008 |

As shown in Table 2, the first comparative example 1 is similar in structure to the first embodiment of the present invention except that the third thin film, namely, the third underlayer 2c is composed of Cr and fails to include V. The second comparative example 2 is specified by the third thin film of CrV which comprises 50 at. % of Cr and 50 at. % of V.

The third and the fourth comparative examples 3 and 4 are manufactured in a manner similar to the first embodiment of the pre sent invention except that the substrate temperatures and the argon gas pressures are varied o n deposition of the third thin film 2c of CrV.

Likewise, the fifth and the sixth comparative examples 5 and 6 are also manufactured by varying the substrate temperatures and the argon gas pressures from those of the twentieth example 20.

The first through the sixth comparative examples 1 to 6 were subjected to running tests which are similar to those mentioned in conjunction with the first through the twenty-fifth examples 1 to 25. In addition, the coercive force (HC), the product (Mrδ), and the S/N ratio were measured as shown in Table 2. in Table 2, the compositions and thicknesses of the third thin films 2c, the substrate temperatures, and the argon gas pressures are also shown along with the differences between the crystal lattice plane distanced $d_{(002)}$ of the magnetic film 3 of CoPtCr and the crystal lattice plane distance $d_{(110)}$ of the underlayer contacted with the magnetic film 3.

From Tables 1-1, 1-2, and 2, it is readily understood that the first through the twenty-second examples 1 to 22 which include the third thin film of CrV are improved in the coercive force (Hc), the product (Mrδ), and the S/N ratio in comparison with the first comparative example 1 which includes the third thin film of Cr.

In addition, the twenty-third through the twenty-fifth examples 23 to 25 which include the third thin films 2c of CrVZr are greater in the coercive force (Hc), the product (Mrδ), and the S/N ratio than the first comparative example 1. Especially, addition of Zr to the CrV alloy is effective to reduce a noise and therefore to improve the S/N ratio. In this event, it is preferable that an amount of Zr falls within a range between 2 and 5 at. %, as shown in Table 1-2.

By comparing Tables 1-1 and 1-2 with Table 2, it has been confirmed that the differences $d_{(002)}$–$d_{(110)}$ between the crystal lattice plane distance $d_{(002)}$ of the magnetic film 3 of CoPt and the crystal lattice plane distance $d_{(110)}$ of the underlayer contacted with the magnetic film 3 are variable in dependency upon the compositions of the underlayers, the substrate temperature, and the argon gas pressures.

For example, the third thin film, namely, the third underlayer 2c of the third comparative example 2 includes 50 at. % of V together with 50 at. % of Cr. In this case, the difference $d_{(002)}$–$d_{(110)}$ is reduced to −0.015 angstrom. Such a reduction of the difference brings about a degradation of the S/N ratio, as compared with the first through the twenty-fifth examples 1 to 25. From this fact, the amount of V in the CrV alloy used as the third thin film 2c Is desirably restricted to a range between 4 and 40 at. %.

In addition, it is readily understood from the third through the sixth comparative examples 3 to 6 that the differences $d_{(002)}$–$d_{(110)}$ are also varied in dependency upon the substrate temperatures and the argon gas pressures. This might be based on the fact that a lattice defect or distortion takes place within the films due to process conditions and is varied with a change of the substrate temperatures and the argon gas pressures.

Accordingly, the differences $d_{(002)}$–$d_{(110)}$ can be controlled within the range between 0.002 and 0.032 angstrom by adjusting the amount of V included in the third thin film 2c together with the substrate temperatures and the argon gas pressures.

For instance, the third and the fourth comparative examples 3 and 4 are identical in the compositions and the thicknesses of the third thin film 2c with the first example 1 but are manufactured under the substrate temperature and the argon gas pressure which are different from those of the first example 1. In the third comparative example 3, the substrate temperature is lowered to 220° C., which increases the difference to 0.037 angstrom. As a result, the coercive force (Hc) and the S/N ratio are reduced to 1720. Oe and 28.8 dB, respectively. In the fourth comparative example 4, the argon gas pressure is increased to 18.0 mTorr. Such an increase of the argon gas pressure renders the difference $d_{(002)}$–$d_{(110)}$ into 0.039 angstrom. This results in the reductions of Mrδ and the S/N ratio, as shown in Table 2.

Furthermore, each of the fifth and the sixth comparative examples 5 and 6 has the composition and the thickness of the third thin film 2c which are identical with those of the twentieth example 20 according to the present invention but is manufactured by the substrate temperature and the argon gas pressure which are different from those of the twentieth example 20. Specifically, the fifth comparative example 5 is manufactured at the substrate temperature higher than the twentieth example 20, which reduces the difference $d_{(002)}$–$d_{(110)}$ to −0.006. As a result, a reduction occurs in Mrδ and the S/N ratio, as shown in Table 2.

On the other hand, the argon gas pressure is reduced to 0.2 mTorr in the sixth comparative example 6. The sixth comparative example 6 has the difference $d_{(002)}$–$d_{(110)}$ reduced to −0.008 angstrom and the reduced coercive force (Hc) and the S/N ratio, as shown in Table 2.

Twenty-Sixth Through Forty-Third Examples 26 to 43:

Twenty-sixth through thirty-fifth examples 26 to 35 are manufactured in a manner similar to the first example 1 except that the compositions of the magnetic films 3 and the compositions of the third thin films 2c are changed from those of the first example 1. Furthermore, thirty-sixth through forty-third examples 36 to 43 are manufactured in a manner similar to the first example 1 except that both of the materials and the compositions of the magnetic film 3 and the compositions of the third thin films 2c are varied from those of the first example 1.

The running tests were made about the twenty-sixth through the forty-third examples 26 to 43 in a manner similar to those mentioned above with the floating height of the magnetic head kept at less than 0.075 μm. The coercive force (Hc), the product Mrδ, and the S/N ratio were evaluated in connection with each example 26 to 43. In Table 3, the compositions of the magnetic films 3, the compositions and the thicknesses of the third thin films 2c, the substrate temperatures, and the argon gas pressures are shown along with the coercive force (Hc), Mrδ, and the S/N ratio. Moreover, the differences the crystal lattice plane distance $d_{(002)}$ and the crystal lattice plane distance $d_{(110)}$ are also enumerated in Table 3.

magnetic properties, such as the coercive force, the product Mrδ and in recording and reproduction properties, such as S/N ratios and OW. With this structure, it has been confirmed that the magnetic disks formed by the above-mentioned examples have a large output and a reduced medium noise even when a surface recording density is increased to 500 Mb/in² or more.

Second Embodiment

Figure 3:
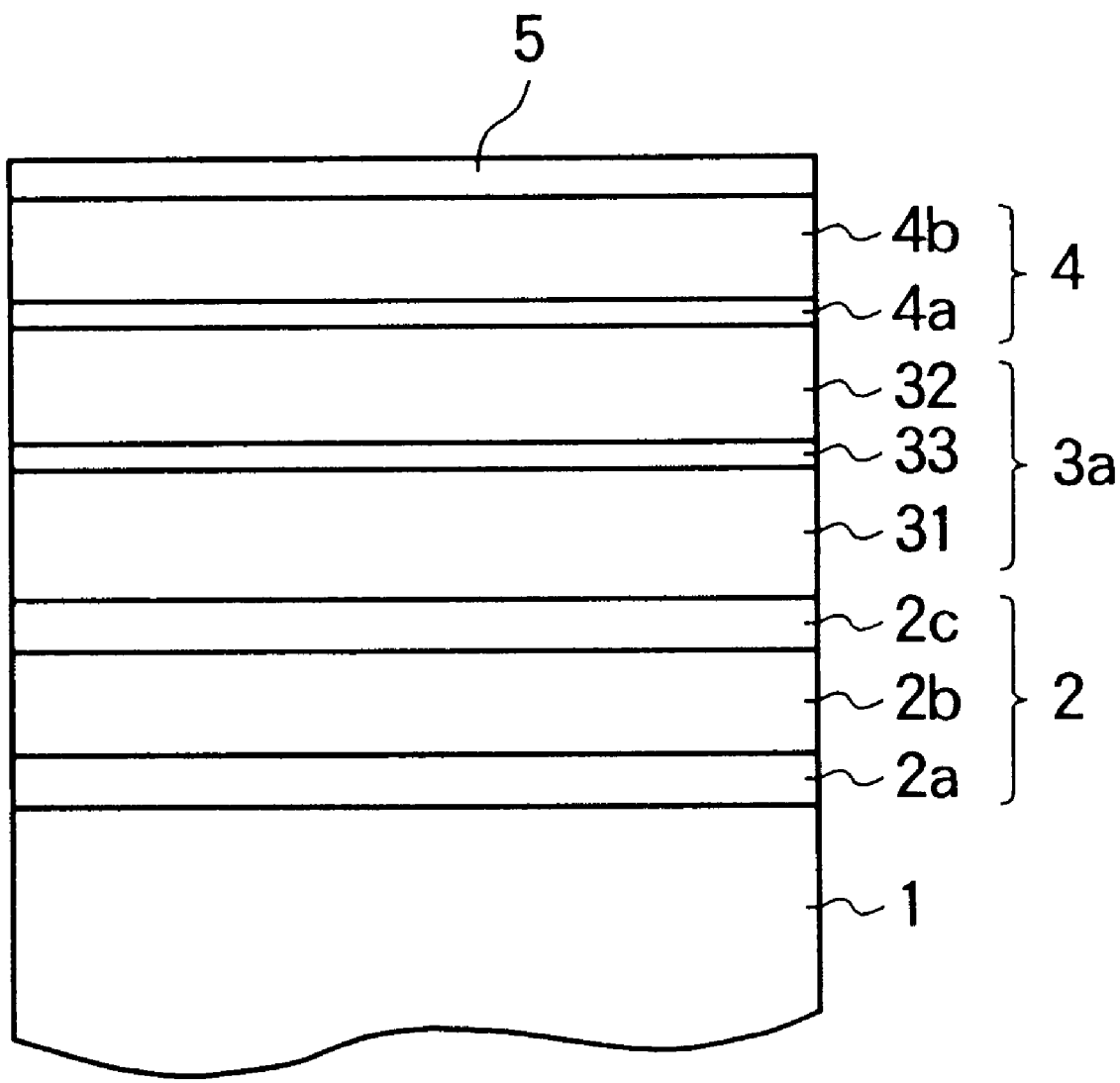
FIG. 3 is a sectional view of a magnetic recording medium according to a second embodiment of the present invention.

First Sample of the Second Embodiment:

Referring to FIG. 3, a magnetic recording medium according to a second embodiment of the present invention is similar in structure to that illustrated in FIG. 1 except that a magnetic lamina 3a is substituted for the magnetic film 3 illustrated in FIG. 1. Specifically, the magnetic lamina 3a is formed by a first magnetic film 31, a second magnetic film 32, and a nonmagnetic intermediate film 33 interposed between the first and the second magnetic films 31 and 32.

TABLE 3

| Example | Magnetic Film (3) Composition 500 Å (at %) | 3rd Thin Film (2c) Composition (at %) | 3rd Thin Film (2c) Thickness (Å) | Substrate Temperature (° C.) | Ar Gas Pressure (mTorr) | Hc (Oe) | Mrδ (memu/cm²) | S/N Ratio (dB) | $d_{(002)}$-$d_{(110)}$ (Å) |
|---|---|---|---|---|---|---|---|---|---|
| 26 | Co₈₄Pt₅Cr₁₁ | Cr₉₀V₁₀ | 50 | 375 | 1.3 | 1780 | 2.35 | 31.4 | +0.010 |
| 27 | " | Cr₈₀V₂₀ | 50 | 375 | 1.3 | 1800 | 2.40 | 31.0 | +0.003 |
| 28 | Co₇₁Pt₁₈Cr₁₁ | Cr₉₀V₁₀ | 50 | 375 | 1.3 | 2150 | 1.98 | 31.6 | +0.032 |
| 29 | " | Cr₈₀V₂₀ | 50 | 375 | 1.3 | 2220 | 1.99 | 32.4 | +0.022 |
| 30 | Co₈₄Pt₁₁Cr₅ | Cr₉₀V₁₀ | 50 | 375 | 1.3 | 1860 | 2.35 | 32.0 | +0.030 |
| 31 | " | Cr₈₀V₂₀ | 50 | 375 | 1.3 | 1900 | 2.37 | 32.5 | +0.020 |
| 32 | Co₇₄Pt₁₁Cr₁₅ | Cr₉₀V₁₀ | 50 | 375 | 1.3 | 2120 | 2.05 | 32.7 | +0.019 |
| 33 | " | Cr₈₀V₂₀ | 50 | 375 | 1.3 | 2140 | 2.05 | 31.8 | +0.009 |
| 34 | Co₆₄Pt₁₁Cr₂₅ | Cr₉₀V₁₀ | 50 | 375 | 1.3 | 2230 | 1.82 | 31.5 | +0.012 |
| 35 | " | Cr₈₀V₂₀ | 50 | 375 | 1.3 | 2300 | 1.80 | 31.0 | +0.003 |
| 36 | Co₈₇Pt₁₁Ta₂ | Cr₉₀V₁₀ | 50 | 375 | 1.3 | 1850 | 2.40 | 30.1 | +0.026 |
| 37 | " | Cr₈₀V₂₀ | 50 | 375 | 1.3 | 1880 | 2.41 | 30.5 | +0.019 |
| 38 | Co₈₄Pt₁₁Ta₅ | Cr₉₀V₁₀ | 50 | 375 | 1.3 | 1900 | 2.20 | 30.0 | +0.032 |
| 39 | " | Cr₈₀V₂₀ | 50 | 375 | 1.3 | 1900 | 2.18 | 30.5 | +0.022 |
| 40 | Co₇₈Pt₁₁Cr₁₁Ta₂ | Cr₉₀V₁₀ | 50 | 375 | 1.3 | 2020 | 2.00 | 33.5 | +0.025 |
| 41 | " | Cr₈₀V₂₀ | 50 | 375 | 1.3 | 1980 | 2.02 | 33.0 | +0.017 |
| 42 | Co₇₃Pt₁₁Cr₁₁Ta₅ | Cr₉₀V₁₀ | 50 | 375 | 1.3 | 2080 | 1.70 | 31.8 | +0.029 |
| 43 | " | Cr₈₀V₂₀ | 50 | 375 | 1.3 | 2050 | 1.72 | 32.2 | +0.021 |

The thirty-fifth examples 26 to 35 comprise the third thin films, namely, the third underlayers 2c of CrV and the magnetic films 3 of the CoPtCr alloy. In addition, the amount of V in the third thin films 2c fall within the range between 10 and 20 at. %. Under the circumstances, high coercive force (Hc) and a high S/N ratio can be accomplished when each of the magnetic films 3 comprises 60–90 at. % of Co, 4–20 at. % of Pt, and 3–30 at. % of Cr. Preferably, the magnetic films 3 may comprise 64–84 at. % of Co, 5–18 at. % of Pt, and 5–18 at. % of Cr in order to achieve high coercive force (Hc) and high S/N ratios.

As apparent from the thirty-sixth through the thirty-ninth examples 36 to 39 which comprise the magnetic films 3 formed by CoPtTa alloys, high coercive force (Hc) and high S/N ratios can be accomplished when 80–90 at. % of Co, 5–15 at. % of Pt, and 1–7 at. % of Ta are included in the magnetic films 3.

Furthermore, the fortieth through the forty-third examples 40 to 43 comprise the magnetic films 3 of CoPtCrTa alloys. In this event, it is preferable that 70–80 at. % of Co, 5–15 at. % of Pt, 5–25 at. % of Cr, and 1–7 at. % of Ta may be included in the magnetic films 3 of the CoPtCrTa alloys so as to obtain high coercive force (Hc) and high S/N ratios.

At any rate, the first through the forty-third examples 1 to 43 according to the first embodiment are excellent in static In any event the illustrated magnetic recording medium will be called a first sample so as to distinguish the second embodiment from the examples according to the first embodiment and is structured by a glass substrate 1, an underlayer 2 on the glass substrate 1, the magnetic lamina 3a, a protection layer 4 on the magnetic lamina 3a, and a lubricant layer 5 on the protection layer 4. The underlayer 2, the magnetic lamina 3a, the protection layer 4, and the lubricant layer 5 are successively deposited on the glass substrate 1 by the use of the in-line sputtering apparatus.

Specifically, the glass substrate 1 is composed of aluminosilicate glass and is subjected to mirror finish to provide a mirror finished surface which has a roughness Ra of 50 angstroms. The illustrated underlayer 2 is formed by a first thin film 2a of Al deposited to a thickness of 50 angstroms on the glass substrate 1, a second thin film 2b of Cr deposited to a thickness of 600 angstroms on the first thin film 2a, and a third thin film 2c of CrV deposited to a thickness of 50 angstroms on the second thin film 2b. In the first sample 1 of the second embodiment, the third thin film 2c has a composition of 96 at. % of Cr and 4 at. % of V.

The first through the third thin films 2a to 2c will be called first through third underlayers, respectively, hereinunder.

In the magnetic lamina 3a, the first magnetic film 31 has the same materials as the second magnetic film 32 and is composed of a CoPtCr alloy which comprises 78 at. % of Co, 11 at. % of Pt, and 11 at. % of Cr. In the illustrated example, each of the first and the second magnetic films 31 and 32 has a thickness of 120 angstroms. On the other hand, the nonmagnetic intermediate film 33 between the first and the second magnetic films 31 and 32 is composed of a CrV alloy comprising 96 at. % of Cr and 4 at. % of V. The nonmagnetic intermediate film 33 is 50 angstroms thick and thinner than the first and the second magnetic films 31 and 32.

The protection layer 4 is composed of a first protection film 4a deposited on the second magnetic film 32 and a second protection film 4b deposited on the first protection film 4a. The first protection film 4a is formed by a Cr film of 50 angstroms thick and serves as a chemical protection film for the magnetic lamina 3a while the second protection film 4b is formed by a silicon oxide film of 160 angstroms thick. In the second protection film 4b, hard fine particles are dispersed to provide wear resistance against a mechanical shock.

The lubricant layer 5 is formed by perfluoropolyether (PFPE) and serves to alleviate a contact with a magnetic head.

Referring to FIG. 4, description will be made about a method of manufacturing the first example illustrated in FIG. 3 by the use of the in-line sputtering apparatus. Like in FIG. 2, the illustrated in-line sputtering apparatus comprises a pallet load chamber 11, a sputtering chamber 12, and a pallet unload chamber 13 all of which are connected in series to one another, as shown in FIG. 4. In the illustrated example, partition walls 14 and 21 are located between the pallet load chamber 11 and the sputtering chamber 12 and between the sputtering chamber 12 and the pallet unload chamber 13, respectively. In addition, the sputtering chamber 12 is divided into a first sputtering chamber 12a and a second sputtering chamber 12b coupled to each other through a partition 22.

Within the first and the second sputtering chambers 12a and 12b, target pairs are arranged in a manner to be described to successively deposit the underlayer 2, the magnetic lamina 3a, and the protection layer 4 on the glass substrate 1 and to manufacture the first sample 1 illustrated in FIG. 3.

Practically, when the pallet 18 which is previously loaded with a plurality of glass substrated 1 is introduced into the pallet load chamber 11, the pallet load chamber 11 is exhausted from the atmospheric pressure to a degree of vacuum which is similar to that of the first and the second sputtering chambers 12a and 12b. Thereafter, the partition wall 14 is opened to introduce the pallet 18 into the first sputtering chamber 12a.

Within the first sputtering chamber 12a, each glass substrate I on the pallet 18 is heated by a lamp heater 19 at a temperature of 300° C. for one minute. Then, the pallet 18 is transferred or transported at a transport speed of 1.2 m/min and allowed to pass between the targets 15a and 16a of Al and thereafter between the targets 15b and 16b of Cr.

Since the targets 15a and 16a of Al and the targets 15b and 16b of Cr are put in discharge states with the argon gas kept at the pressure of 5 mTorr, the first thin films 2a and the second thin films 2b are successively deposited in that order on both surfaces of each glass substrate 1 mounted on the pallet 18. The targets 15a and 16a of Al are supplied with the electric power of 300 watts while the targets 15b and 16b of Cr are supplied with the electric power of 1.0 kilowatts during the sputtering. As a result, the first and the second thin films 2a and 2b have the thicknesses of 50 and 600 angstroms, as mentioned above.

Subsequently, the pallet 18 is transported or transferred through the partition or port 22 to the second sputtering chamber 12b which has a heater 20. The transported pallet 18 is heated by the heater 20 to a temperature of 375° C. for one minute within the second sputtering chamber 12b.

In order to successively deposit the films illustrated in FIG. 3 in the illustrated order on the second thin films 2b, CrV targets 15c and 16c, CoPtCr targets 15d and 16d, CrV targets 15e and 16e, CoPtCr targets 15f and 16f, and Cr targets 15g and 16g are arranged within the second sputtering chamber 12b and are put in discharge states with the argon gas kept at the pressure of 1.3 mTorr. The pallet 18 is transported at the transfer speed of 1.2 m/min between the respective target pairs, namely, 15c and 16d to 15g and 16g.

During the transportation or movement of the pallet 18, the third thin film or third underlayer 2c of CrV, the first magnetic film 31 of CoPtCr, the nonmagnetic intermediate film 33 of CrV, the second magnetic film 32 of CoPtCr, and the first protection film 4a of Cr are successively stacked in that order on the second thin film 2b in the second sputtering chamber 12b. In this event, the CrV targets 15c and 16c and 15e and 16e are supplied with electric power of 500 watts while the CoPtCr targets 15d and 16d and 15f and 16f are supplied with electric power of 300 watts. In addition, the Cr targets 15g and 16g are given electric power of 500 watts.

During the sputtering, the first and the second sputtering chambers 12a and 12b are kept at a degree of vacuum which is equal to or less than $5 \times 10^{-6}$ Torr. Under the circumstances, the third thin film 2c of CrV has the thickness of 50 angstroms while each of the first and the second magnetic films 31 and 32 has the thickness of 120 angstroms. Likewise, the nonmagnetic intermediate film 33 of CrV is 50 angstroms thick while the first protection film 4a is 50 angstroms thick, as mentioned before.

After completion of the above-mentioned deposition, the first protection film 4a is washed by isopropyl alcohol (IPA) to conduct hydrophilication. Thereafter, the second protection film 4b is formed on the first protection film by immersing the above-processed substrate within an organic silicon compound solution and by firing the substrate to leave a silicon dioxide film on the first protection film 4a. The organic silicon compound solution may be, for example, a solution of water, IPA, and tetraethoxysilane in which fine particles of silica are dispersed which have a particle size of 100 angstroms.

Finally, the lubricant layer 5 is formed on the second protection film 4b by a dipping process using perfluoropolyether (PFPE). Thus, the first sample according to the second embodiment of the present invention is manufactured and is operable as a magnetic disk.

Like in the first embodiment, the running test was carried out with a floating height kept at 0.075 μm in connection with the first sample 1. The first sample 1 exhibited an excellent result. Furthermore, measurement of the first sample 1 was made about the coercive force (Hc), the product (Mrδ) of residual magnetization and thickness, the S/N ratio. Such measurement results are tabulated in Table 4-1.

Table 4-1 shows a composition and a thickness of the third thin film 2c of CrV, a composition and a thickness of the nonmagnetic intermediate film 33, and a substrate temperature and an argon gas pressure on depositing the third thin film 2c and the nonmagnetic intermediate film 33 together with the coercive force (Hc), the product (Mrδ), and the S/N ratio.

Herein, each of the first and the second magnetic films 31 and 32 of CoPtCr has a hcp crystal structure having (002)

planes distant from each other while each of the third thin film 2c and the nonmagnetic intermediate film 33 of CrV has a bcc crystal structure having (110) planes distant from each other A distance between the thin film 2c and the nonmagnetic intermediate film 33 are manufactured under the same conditions and the first and the second magnetic films 31 and 32 are manufactured on the same conditions. Accordingly, the relationship between the

TABLE 4-1

| Sample | Magnetic Film (31 & 32) Composition 120 Å × 2 (at %) | 3rd Thin Film (2c) Composition (at %) | 3rd Thin Film (2c) Thickness (Å) | Nonmagnetic Intermediate Film (33) Composition (at %) | Nonmagnetic Intermediate Film (33) Thickness (Å) | Substrate Temperature (°C.) | Ar Gas Pressure (mTorr) | Hc (Oe) | Mr δ (menu/cm$^2$) | S/N Ratio (dB) | $d_{(002)}$-$d_{(110)}$ (Å) |
|---|---|---|---|---|---|---|---|---|---|---|---|
| 1 | $Co_{78}Pt_{11}Cr_{11}$ | $Cr_{96}V_4$ | 50 | $Cr_{96}V_4$ | 50 | 375 | 1.3 | 1970 | 0.95 | 35.5 | +0.028 |
| 2 | " | " | 100 | " | 50 | 375 | 1.3 | 2010 | 0.92 | 35.7 | +0.027 |
| 3 | " | " | 50 | " | 50 | 300 | 1.3 | 1860 | 0.93 | 35.0 | +0.032 |
| 4 | " | " | 50 | " | 50 | 375 | 5.0 | 1900 | 0.95 | 35.1 | +0.032 |
| 5 | " | $Cr_{90}V_{10}$ | 50 | $Cr_{90}V_{10}$ | 50 | 375 | 1.3 | 2060 | 0.99 | 36.9 | +0.025 |
| 6 | " | " | 100 | " | 50 | 375 | 1.3 | 2090 | 0.95 | 37.1 | +0.024 |
| 7 | " | " | 20 | " | 50 | 375 | 1.3 | 2000 | 0.94 | 36.9 | +0.026 |
| 8 | " | " | 50 | " | 20 | 375 | 1.3 | 2000 | 0.98 | 36.8 | +0.025 |
| 9 | " | " | 50 | " | 50 | 300 | 1.3 | 1960 | 0.94 | 36.1 | +0.028 |
| 10 | " | " | 50 | " | 50 | 375 | 5.0 | 1950 | 0.95 | 36.2 | +0.029 |
| 11 | " | $Cr_{80}V_{20}$ | 50 | $Cr_{80}V_{20}$ | 50 | 375 | 1.3 | 2030 | 1.00 | 36.5 | +0.015 |
| 12 | " | " | 100 | " | 50 | 375 | 1.3 | 2050 | 0.95 | 36.9 | +0.014 |
| 13 | " | " | 20 | " | 50 | 375 | 1.3 | 2010 | 0.92 | 36.8 | +0.015 |
| 14 | " | " | 50 | " | 20 | 375 | 1.3 | 2010 | 0.99 | 36.6 | +0.015 |
| 15 | " | " | 50 | " | 50 | 300 | 1.3 | 1950 | 0.96 | 36.3 | +0.018 |
| 16 | " | " | 50 | " | 50 | 375 | 5.0 | 1950 | 0.95 | 36.1 | +0.020 |

TABLE 4-2

| Sample | Magnetic Film (31 & 32) Composition 120 Å × 2 (at %) | 3rd Thin Film (2c) Composition (at %) | 3rd Thin Film (2c) Thickness (Å) | Nonmagnetic Intermediate Film (33) Composition (at %) | Nonmagnetic Intermediate Film (33) Thickness (Å) | Substrate Temperature (°C.) | Ar Gas Pressure (mTorr) | Hc (Oe) | Mr δ (menu/cm$^2$) | S/N Ratio (dB) | $d_{(002)}$-$d_{(110)}$ (Å) |
|---|---|---|---|---|---|---|---|---|---|---|---|
| 17 | $Co_{78}Pt_{11}Cr_{11}$ | $Cr_{70}V_{30}$ | 50 | $Cr_{70}V_{30}$ | 50 | 375 | 1.3 | 1970 | 0.97 | 35.3 | +0.006 |
| 18 | " | " | 100 | " | 50 | 375 | 1.3 | 2000 | 1.00 | 35.5 | +0.007 |
| 19 | " | " | 20 | " | 50 | 375 | 1.3 | 1970 | 0.94 | 35.4 | +0.006 |
| 20 | " | " | 50 | $Cr_{70}V_{30}$ | 20 | 375 | 1.3 | 1970 | 0.97 | 35.4 | +0.006 |
| 21 | " | " | 50 | " | 50 | 300 | 1.3 | 1870 | 0.95 | 35.0 | +0.012 |
| 22 | " | " | 50 | " | 50 | 375 | 5.0 | 1900 | 0.94 | 35.0 | +0.010 |
| 23 | " | $Cr_{60}V_{40}$ | 50 | $Cr_{60}V_{40}$ | 50 | 375 | 1.3 | 1930 | 0.95 | 35.1 | +0.002 |
| 24 | " | " | 50 | " | 50 | 300 | 1.3 | 1850 | 1.01 | 35.0 | +0.005 |
| 25 | " | " | 50 | " | 50 | 375 | 5.0 | 1900 | 0.99 | 35.1 | +0.004 |
| 26 | " | $Cr_{93}V_4Zr_3$ | 50 | $Cr_{93}V_4Zr_3$ | 50 | 375 | 1.3 | 2070 | 1.01 | 37.5 | +0.027 |
| 27 | " | $Cr_{84}V_{12}Zr_4$ | 50 | $Cr_{84}V_{12}Zr_4$ | 50 | 375 | 1.3 | 2130 | 1.00 | 38.0 | +0.024 |
| 28 | " | $Cr_{80}V_{16}Zr_4$ | 50 | $Cr_{80}V_{16}Zr_4$ | 50 | 375 | 1.3 | 2160 | 1.05 | 38.2 | +0.022 |
| 29 | " | $Cr_{71}V_{24}Zr_5$ | 50 | $Cr_{71}V_{24}Zr_5$ | 50 | 375 | 1.3 | 2090 | 1.00 | 37.5 | +0.015 |

(002) planes will be referred to as a first crystal lattice plane distance and depicted at $d_{(002)}$ while a distance between the (110) planes will be referred to as a second crystal lattice plane distance and depicted at $d_{(110)}$, as mentioned in conjunction with the first embodiment.

Herein, let relationships between the first and the second crystal lattice plane distances $d_{(002)}$ and $d_{(110)}$ be considered not only about the third thin film 2c of CrV and the first magnetic film 31 of CoPtCr but also about the nonmagnetic intermediate film 33 of CrV and the second magnetic film 32 of CoPtCr. At any rate, the third thin film 2c and the nonmagnetic intermediate film 33 are contacted with the first and the second magnetic films 31 and 32, respectively.

In addition, it is to be noted that the above relationship between the third thin film 2c and the first magnetic film 31 is identical with that between the nonmagnetic intermediate film 33 and the second magnetic film 32 because the third thin film 2c and the first magnetic film 31 applies to the relationship between the nonmagnetic intermediate film 33 and the second magnetic film 32. The above relationship is specified by a difference which is obtained by subtracting the second crystal lattice plane distance $d_{(110)}$ from the first crystal lattice plane distance $d_{(002)}$ and which may be simply represented by a difference $d_{(002)}$-$d_{(110)}$. Taking the above into consideration, the difference $d_{(002)}$-$d_{(110)}$ between thee nonmagnetic intermediate film 33 and the second magnetic film 32 alone is tabulated in Table 4-1. This is true of Tables 4-2 and 5 which will be shown hereinafter.

As apparent from Table 4-1, the first sample 1 has the difference $d_{(002)}$-$d_{(110)}$ of +0.028 angstrom.

The S/N ratio was evaluated by using a thin film head which operates with a floating height kept at 0.060 μm at a relative speed of 5 m/s between the thin film head and the magnetic disk or the first sample 1, and by measuring recording and reproducing outputs appearing on the track recording density of 110 kfci. In addition, a noise spectrum of the magnetic disk was measured during the signal recording and reproduction of the magnetic disk by a spectrum analyzer which had a carrier frequency and a measuring bandwidth which were set to 8.5 MHz and 20 MHz, respectively. The thin film disk was an MR head which had a recording track width of 4.2 μm, a reproduction track width of 3.5 μm, a recording gap length of 0.43 μm, and a reproducing gap length of 0.31 μm.

Second through Twenty-Ninth Samples 2 to 29:

In Tables 4-1 and 4-2, the second through the twenty-fifth samples 2 to 25 were manufactured in a manner similar to the first sample 1 except that the compositions and the thicknesses of the third thin films 2c of CrV, the compositions and the thicknesses of the nonmagnetic intermediate films 33 of CrV were changed, as shown in Tables 4-1 and 4-2, together with the substrate temperatures and the argon gas pressures on depositing the third thin films 2c and the nonmagnetic intermediate films 33.

In Table 4-2, the twenty-sixth through the twenty-ninth samples 26 to 29 were manufactured in a manner similar to the first sample 1 except that the third thin films 2c and the nonmagnetic intermediate films 33 were formed by alloys including CrVZr at different ratios. Each of the third thin films 2c and the nonmagnetic intermediate films 33 was deposited to a thickness of 50 angstroms.

The running tests were conducted in connection with the second through the twenty-ninth samples 2 to 29 with the floating head of the thin film head kept at 0.075 μm. The results of the running tests were excellent. Like in the first sample 1, the coercive force (Hc), the product (Mrδ), and the S/N ratio were measured in a manner similar to the first sample 1 and tabulated in Tables 4-1 and 4-2. In addition, Tables 4-1 and 4-2 show the compositions and the thicknesses of the third thin films 2c of CrV, the compositions and the thicknesses of the nonmagnetic intermediate films 33, and the substrate temperatures and the argon gas pressures on deposition of the third thin films 2c and the nonmagnetic intermediate films 33. Moreover, the differences $d_{(002)}-d_{(110)}$ of the second through the twenty-ninth samples 2 to 29 which are mentioned in conjunction with the first sample 1 have been also listed in Tables 4-1 and 4-2.

First Through Sixth Comparative Samples:

First through sixth comparative samples were fabricated in μmanner which is somewhat different from those of the first through the twenty-ninth samples 1 to 29. Specifically, the first comparative sample 1 is similar to the first sample 1 except that each of the third thin film 2c and the nonmagnetic intermediate film 33 is formed by Cr alone without V. The second comparative sample 2 comprises the third thin film 2c and the nonmagnetic intermediate film 33 which are different in composition from those of the first sample 1. In addition, the third and the fourth comparative samples 3 and 4 are manufactured in μmanner similar to that of the first sample 1 except that the substrate temperatures and the argon gas pressures on deposition of the third thin films 2c and the nonmagnetic intermediate films 33 are changed from those used in manufacturing the first sample 1. Similarly, the fifth and the sixth comparative samples 5 and 6 had the third thin films 2c and the nonmagnetic intermediate films 33 which were manufactured under the substrate temperatures and the argon gas pressures different from those of the twenty-third sample 23.

The running tests were conducted in connection with the first through the sixth comparative samples 1 to 6 with the floating height of the magnetic head kept at 0.075 μm. Subsequently, the coercive force (Hc), the product (Mrδ), and the S/N ratio were measured in the manner mentioned in conjunction with the first sample 1. The results are listed on Table 5 together with the compositions and the thicknesses of the third thin films 2c, the compositions and the thicknesses of the nonmagnetic intermediate films 33, the substrate temperatures, and the argon gas pressures. Furthermore, the differences $d_{(002)}-d_{(110)}$ mentioned above are also tabulated in Table 5 to specify the relationships between the first or the second magnetic film 31 or 32 and the third thin film 2c or the nonmagnetic intermediate film 33.

As shown in Tables 4-1, 4-2, and 5, the first through the twenty-fifth samples 1 to 25 which have the third thin films 2c and the nonmagnetic intermediate films 33 formed by CrV have been improved in coercive force (Hc), the product (Mrδ), and the S/N ratio as compared with the first comparative sample 1 listed in Table 5.

In addition, the twenty-sixth through the twenty-ninth samples 26 to 29 which have the third thin films 2c and the nonmagnetic intermediate films 33 of CrVzr are also improved in the coercive force (Hc), the product (Mrδ), and the S/N ratio in comparison with the first

TABLE 5

| Sample | Magnetic Film (31 & 32) Composition 120 Å × 2 (at %) | 3rd Thin Film (2c) Composition (at %) | Thickness (Å) | Nonmagnetic Intermediate Film (33) Composition (at %) | Thickness (Å) | Substrate Temperature (°C.) | Ar Gas Pressure (mTorr) | Hc (Oe) | Mr δ (menu/cm²) | S/N Ratio (dB) | $d_{(002)}-d_{(110)}$ (Å) |
|---|---|---|---|---|---|---|---|---|---|---|---|
| 1 | Co₇₈Pt₁₁Cr₁₁ | Cr | 50 | Cr | 50 | 375 | 1.3 | 1700 | 0.86 | 32.5 | +0.035 |
| 2 | " | Cr₅₀V₅₀ | 50 | Cr₅₀V₅₀ | 50 | 375 | 1.3 | 1920 | 0.95 | 32.6 | -0.015 |
| 3 | " | Cr₉₆V₄ | 50 | Cr₉₅V₄ | 50 | 220 | 1.3 | 1770 | 0.99 | 32.5 | +0.037 |
| 4 | " | " | 50 | " | 50 | 375 | 18.0 | 1970 | 0.82 | 32.3 | +0.039 |
| 5 | " | Cr₆₀V₄₀ | 50 | Cr₆₀V₄₀ | 50 | 430 | 1.3 | 1930 | 0.80 | 32.3 | -0.006 |
| 6 | " | " | 50 | " | 50 | 375 | 0.2 | 1830 | 0.99 | 32.1 | -0.008 | comparative sample 1 which has the third thin film 2c and the nonmagnetic intermediate film 33 each of which is formed by Cr. Especially, addition of Zr to the CrV alloy is very effective to reduce a noise and results in an improvement of the S/N ratio. Preferably, the amounts of zr may be restricted to a range between 2 and 5 at. % so as to reduce the noise and to thereby improve the S/N ratio.

By comparing the first through the twenty-ninth samples 1 to 29 of Tables 4-1 and 4-2 with the second through the sixth samples 2 to 6 of Table 5, it has been found out that the differences $d_{(002)}-d_{(110)}$ of the crystal lattice plane distances between the first magnetic films 31 and the third thin films 2c and the second magnetic films 32 and the nonmagnetic intermediate films 33 are variable in dependency upon the compositions of the third thin films 2c and the nonmagnetic intermediate films 33, the substrate temperatures, and the argon gas pressures. For example, the second comparative sample 2 of Table 2 has the third thin film 2c and the nonmagnetic intermediate film 33 each of which comprises 50 at % of V and 50 at. % of Cr. This renders the differences $d_{(002)}-d_{(110)}$ into −0.015 angstrom and results in a reduction of the S/N ration in comparison with the first through the twenty-ninth samples 1 to 29.

As a result, it may be concluded that the amount of V in the CrV alloy preferably falls within a range between 4 and 40 at. % in each of the third thin film 2c and the nonmagnetic intermediate film 33.

As apparent from the results of the third through the sixth comparative samples 3 to 6, the differences $d_{(002)}-d_{(110)}$ are widely varied by the substrate temperatures and the argon gas pressures. Such a variation might result from the fact that a lattice distortion in each film is changed by the substrate temperature and the argon gas pressure. In other words, the differences $d_{(002)}-d_{(110)}$ can be adjusted to a range between 0.002 and 0.032 angstrom by controlling the substrate temperature and the argon gas pressure together with the amount of V included in the third thin film 2c and the nonmagnetic intermediate film 33.

The third and the fourth comparative samples 3 and 4 shown in Table 5 are identical with the first sample 1 of Table 4-1 in the compositions and the thicknesses of the third thin film 2c and the nonmagnetic intermediate film 33. However, the third thin film 2c and the nonmagnetic intermediate film 33 of each of the third and the fourth comparative samples 3 and 4 were deposited under the substrate temperature and the argon gas pressure different from those of the first sample 1.

Specifically, the third thin film 2c and the nonmagnetic intermediate film 33 of the third comparative sample 3 are deposited at the temperature of 220° C. which is very lower than that of the first sample 1. This increases the difference $d_{(002)}-d_{(110)}$ of the third comparative sample 3 to 0.037 angstrom, as listed in Table 5 and consequently reduces the coercive force (Hc) and the S/N ratio. In the fourth comparative sample 4, the argon gas pressure is extremely increased. Such an increase of the argon gas pressure renders the difference $d_{(002)}-d_{(110)}$ into 0.039 angstrom and results in a reduction of Mrδ and the S/N ratio.

In the fifth and the sixth comparative samples 5 and 6, the third thin films 2c and the nonmagnetic intermediate films 33 have the same compositions and thicknesses as those of the twenty-third sample 23 but are deposited on the substrate temperatures and the argon gas pressures different from those of the twenty-third sample 23. Specifically, the substrate temperature is raised up to the temperature of 430° C. In the fifth comparative sample 5, which renders the difference $d_{(002)}-d_{(110)}$ into −0.006 angstrom. As a result, the product Mrδ and the S/N ratio is reduced in comparison with the twenty-third sample 23. On the other hand, the argon gas pressure is lowered or reduced to 0.2 mTorr in the sixth comparative sample 6. Such a reduction of the argon gas pressure renders the difference $d_{(002)}-d_{(110)}$ into −0.008 angstrom and results in a reduction of the coercive force (Hc) and the S/N ratio as compared with the twenty-third sample 23.

Thirtieth Through Forty-Sixth Samples 30 to 46:

Thirtieth through forty-sixth samples 30 to 46 are similar in structure to the first through the twenty-ninth samples 1 to 29 illustrated in FIG. 4 except that the third thin films 2c and the nonmagnetic intermediate films 33 includes Cr and V at ratios different from that of the first sample 1 and that the ratios of Cr and V in the third thin films 2c are varied from the ratios of Cr and V in the nonmagnetic intermediate films 33. In addition, it is to be noted that the forty-fourth through the forty-sixth samples 44 to 46 included the first thin film 2a of Al which was deposited to a thickness of 50 angstroms by sputtering and which had a surface roughness Ra of 10 angstroms and the sole protection layer 4 of carbon which was deposited to a thickness of 130 angstroms by sputtering.

The thirtieth through the forty-sixth samples 30 to 46 thus obtained were subjected to the running tests with the floating height of the thin film head kept at 0.075 μm and found to be excellent. The coercive force (Hc), the product (Mrδ), and the S/N ratio were measured in the manner mentioned above to evaluate each sample 30 to 46. The results of the measurement are shown in Table 6 along with the substrate temperatures and the argon gas pressures.

As shown in Table 6, when the third thin film 2c which includes 4 to 40 at. % of V is combined with the nonmagnetic intermediate film 33 which also includes 4 to 40 at. % of V, it has been found out that the coercive force (Hc), the product (Mrδ), and the S/N ratio are increased.

TABLE 6

| | Magnetic Film (31 & 32) | 3rd Thin Film (2c) | | Nonmagnetic Intermediate Film (33) | | Substrate | | | | | $d_{(002)} - d_{(110)}$ (Å) | |
|---|---|---|---|---|---|---|---|---|---|---|---|---|
| | | | | | | | | | | | Magnetic Film | Magnetic Film |
| Sample | Composition 120 Å × 2 (at %) | Composition (at %) | Thickness (Å) | Composition (at %) | Thickness (Å) | Temperature (°C.) | Ar Gas Pressure (mTorr) | Hc (Oe) | Mr δ (menu/cm²) | S/N Ratio (dB) | (31) & 3rd Thin Film (2c) | (32) & Nonmagnetic Intermediate Film (33) |
| 30 | $Co_{78}Pt_{11}Cr_{11}$ | $Cr_{98}V_4$ | 50 | $Cr_{90}V_{10}$ | 50 | 375 | 1.3 | 1960 | 0.95 | 35.6 | +0.02 | +0.026 |
| 31 | " | " | 50 | $Cr_{80}V_{20}$ | 50 | 375 | 1.3 | 2010 | 0.95 | 35.5 | " | +0.015 |
| 32 | " | " | 50 | $Cr_{60}V_{40}$ | 50 | 375 | 1.3 | 1920 | 0.93 | 35.0 | " | +0.002 |
| 33 | " | $Cr_{90}V_{10}$ | 50 | $Cr_{96}V_4$ | 50 | 375 | 1.3 | 1920 | 0.97 | 36.0 | +0.02 | +0.028 |
| 34 | " | " | 50 | $Cr_{80}V_{20}$ | 50 | 375 | 1.3 | 2060 | 0.98 | 37.0 | " | +0.015 |
| 35 | " | " | 50 | $Cr_{70}V_{30}$ | 50 | 375 | 1.3 | 1950 | 0.98 | 36.4 | " | +0.006 |
| 36 | " | " | 50 | $Cr_{60}V_{40}$ | 50 | 375 | 1.3 | 1950 | 0.97 | 36.0 | " | +0.002 |
| 37 | " | $Cr_{80}V_{20}$ | 50 | $Cr_{96}V_4$ | 50 | 375 | 1.3 | 1970 | 0.99 | 36.0 | +0.01 | +0.028 |
| 38 | " | " | 50 | $Cr_{90}V_{10}$ | 50 | 375 | 1.3 | 2020 | 0.96 | 36.9 | " | +0.025 |
| 39 | " | " | 50 | $Cr_{70}V_{30}$ | 50 | 375 | 1.3 | 2000 | 0.97 | 36.1 | " | +0.006 |
| 40 | " | " | 50 | $Cr_{60}V_{40}$ | 50 | 375 | 1.3 | 2000 | 1.00 | 36.0 | " | +0.002 |
| 41 | " | $Cr_{70}V_{30}$ | 50 | $Cr_{96}V_4$ | 50 | 375 | 1.3 | 1920 | 1.00 | 35.0 | +0.00 | +0.028 |

TABLE 6-continued

| | Magnetic Film (31 & 32) | 3rd Thin Film (2c) | | Nonmagnetic Intermediate Film (33) | | Substrate | | | | | $d_{(002)} - d_{(110)}$ (Å) | |
|---|---|---|---|---|---|---|---|---|---|---|---|---|
| Sample | Composition 120 Å × 2 (at %) | Composition (at %) | Thickness (Å) | Composition (at %) | Thickness (Å) | Temperature (°C.) | Ar Gas Pressure (mTorr) | Hc (Oe) | Mr δ (menu/ cm$^2$) | S/N Ratio (dB) | Magnetic Film (31) & 3rd Thin Film (2c) | Magnetic Film (32) & Nonmagnetic Intermediate Film (33) |
| 42 | " | " | 50 | $Cr_{90}V_{10}$ | 50 | 375 | 1.3 | 1970 | 0.98 | 35.5 | " | +0.025 |
| 43 | " | " | 50 | $Cr_{80}V_{20}$ | 50 | 375 | 1.3 | 1950 | 0.97 | 35.4 | " | +0.015 |
| 44 | " | $Cr_{60}V_{40}$ | 50 | $Cr_{90}V_{10}$ | 50 | 375 | 1.3 | 1910 | 0.95 | 35.3 | +0.00 | +0.025 |
| 45 | " | " | 50 | $Cr_{80}V_{20}$ | 50 | 375 | 1.3 | 1900 | 0.94 | 35.2 | " | +0.015 |
| 46 | " | " | 50 | $Cr_{70}V_{30}$ | 50 | 375 | 1.3 | 1960 | 0.96 | 35.0 | " | +0.006 |

In order to improve the S/N ratio, it is preferable that the third thin film 2c of CrV which includes 4–40 at. % of V is combined with the nonmagnetic intermediate film 33 of CrV which includes 10–20 at. % of V or that the third thin film 2c of CrV which includes 10–20 at. % of V is combined with the nonmagnetic intermediate film 33 of CrV which includes 4–40 at. % of V. For improvement of the S/N ratio, an optimum combination of the third thin film 2c and the nonmagnetic intermediate film 33 is given by a combination of the third thin film 2c including 10–20 at. % of V and the nonmagnetic intermediate film 33 including 10–20 at. % of V.

As mentioned before, the ratios of Cr to V of the third thin films 2c are different from those of the nonmagnetic intermediate films 33 in the thirtieth through the forty-sixth samples 30 to 46. Accordingly, the differences $d_{(002)}-d_{(110)}$ of the crystal lattice plane distances between the first magnetic films 31 and the third thin films 2c are somewhat different from the differences $d_{(002)}-d_{(110)}$ of the crystal lattice plane distances between the second magnetic films 32 and the nonmagnetic intermediate films 33, as listed in Table 6. However, both the former and the latter differences all fall within the range between 0.002 and 0.032 angstrom.

Forty-Seventh Through Sixty-Fourth Samples:

Forty-seventh through sixty-fourth samples according to the second embodiment of the present invention were manufactured in a manner similar to that mentioned in conjunction with the first sample 1 except that the ratios of the third thin films 2c and the nonmagnetic intermediate films 33 are changed from those of Table 1, as shown in Table 7. In Table 7, it is to be noted that the ratio of the third thin film 2c of each sample 47 to 64 are substantially identical with that of the nonmagnetic intermediate film 33 and is not changed from the latter.

More specifically, the ratio of compositions in each of the first and the second magnetic films 31 and 32, the ratio of compositions in each third thin film 2c, and the ratio of compositions in each nonmagnetic intermediate film 33 are varied in the forty-seventh to the fifty-sixth samples 47 to 56, as shown in Table 7, from those of the first sample 1 listed in Table 4-1.

Likewise, it is apparent from Table 7 that the materials and the ratios of compositions in the first and the second magnetic films 31 and 32, the ratios of compositions in the third thin films 2c, and the ratios of compositions in the nonmagnetic intermediate films 33 are varied in the fifty-seventh through the sixty-fourth samples 57 to 64 from those of the first sample 1.

The forty-seventh through the sixty-fourth samples 47 to 64 were subjected to the running tests with the floating height of the thin film head kept at less than 0.075 μm and exhibited excellent results. The coercive force (Hc), the product (Mrδ), and the S/N

TABLE 7

| | Magnetic Film (31 & 32) Composition | 3rd Thin Film (2c) | | Nonmagnetic Intermediate Film (33) | | Substrate | Ar Gas | | | | |
|---|---|---|---|---|---|---|---|---|---|---|---|
| Sample | 120 Å × 2 (at %) | Composition (at %) | Thickness (Å) | Composition (at %) | Thickness (Å) | Temperature (°C.) | Pressure (mTorr) | Hc (Oe) | Mr δ (menu/ cm$^2$) | S/N Ratio (dB) | $d_{(002)}$- $d_{(110)}$ (Å) |
| 47 | $Co_{84}Pt_5Cr_{11}$ | $Cr_{90}V_{10}$ | 50 | $Cr_{90}V_{10}$ | 50 | 375 | 1.3 | 1830 | 1.07 | 35.3 | +0.010 |
| 48 | " | $Cr_{80}V_{20}$ | 50 | $Cr_{80}V_{20}$ | 50 | 375 | 1.3 | 1850 | 1.08 | 35.1 | +0.003 |
| 49 | $Co_{71}Pt_{18}Cr_{11}$ | $Cr_{90}V_{10}$ | 50 | $Cr_{90}V_{10}$ | 50 | 375 | 1.3 | 2200 | 0.85 | 35.5 | +0.032 |
| 50 | " | $Cr_{80}V_{20}$ | 50 | $Cr_{80}V_{20}$ | 50 | 375 | 1.3 | 2270 | 0.86 | 36.4 | +0.022 |
| 51 | $Co_{84}Pt_{11}Cr_5$ | $Cr_{90}V_{10}$ | 50 | $Cr_{90}V_{10}$ | 50 | 375 | 1.3 | 1910 | 1.07 | 35.7 | +0.030 |
| 52 | " | $Cr_{80}V_{20}$ | 50 | $Cr_{80}V_{20}$ | 50 | 375 | 1.3 | 1950 | 1.08 | 36.1 | +0.020 |
| 53 | $Co_{74}Pt_{11}Cr_{15}$ | $Cr_{90}V_{10}$ | 50 | $Cr_{90}V_{10}$ | 50 | 375 | 1.3 | 2170 | 0.94 | 36.4 | +0.019 |
| 54 | " | $Cr_{80}V_{20}$ | 50 | $Cr_{80}V_{20}$ | 20 | 375 | 1.3 | 2190 | 0.92 | 35.5 | +0.009 |
| 55 | $Co_{64}Pt_{11}Cr_{25}$ | $Cr_{90}V_{10}$ | 50 | $Cr_{90}V_{10}$ | 50 | 375 | 1.3 | 2280 | 0.80 | 35.7 | +0.012 |
| 56 | " | $Cr_{80}V_{20}$ | 50 | $Cr_{80}V_{20}$ | 50 | 375 | 1.3 | 2350 | 0.80 | 35.0 | +0.003 |
| 57 | $Co_{87}Pt_{11}Ta_2$ | $Cr_{90}V_{10}$ | 50 | $Cr_{90}V_{10}$ | 50 | 375 | 1.3 | 1900 | 1.09 | 34.1 | +0.026 |
| 58 | " | $Cr_{80}V_{20}$ | 50 | $Cr_{80}V_{20}$ | 50 | 375 | 1.3 | 1930 | 1.10 | 34.8 | +0.019 |
| 59 | $Co_{84}Pt_{11}Ta_5$ | $Cr_{90}V_{10}$ | 50 | $Cr_{90}V_{10}$ | 50 | 375 | 1.3 | 1950 | 1.00 | 34.0 | +0.032 |
| 60 | " | $Cr_{80}V_{20}$ | 50 | $Cr_{80}V_{20}$ | 20 | 375 | 1.3 | 1950 | 1.09 | 34.6 | +0.024 |
| 61 | $Co_{78}Pt_{11}Cr_{11}Ta_2$ | $Cr_{90}V_{10}$ | 50 | $Cr_{90}V_{10}$ | 50 | 375 | 1.3 | 2070 | 0.89 | 36.8 | +0.027 |
| 62 | " | $Cr_{80}V_{20}$ | 50 | $Cr_{80}V_{20}$ | 50 | 375 | 1.3 | 2030 | 0.90 | 36.7 | +0.017 |

TABLE 7-continued

| Sample | Magnetic Film (31 & 32) Composition 120 Å × 2 (at %) | 3rd Thin Film (2c) Composition (at %) | Thickness (Å) | Nonmagnetic Intermediate Film (33) Composition (at %) | Thickness (Å) | Substrate Temperature (°C.) | Ar Gas Pressure (mTorr) | Hc (Oe) | Mr δ (menu/cm²) | S/N Ratio (dB) | $d_{(002)}$-$d_{(110)}$ (Å) |
|---|---|---|---|---|---|---|---|---|---|---|---|
| 63 | $Co_{73}Pt_{11}Cr_{11}Ta_5$ | $Cr_{90}V_{10}$ | 50 | $Cr_{90}V_{10}$ | 50 | 375 | 1.3 | 2130 | 0.73 | 35.4 | +0.030 |
| 64 | " | $Cr_{80}V_{20}$ | 50 | $Cr_{80}V_{20}$ | 50 | 375 | 1.3 | 2100 | 0.75 | 35.6 | +0.020 | ratio were measured in the manner mentioned above to evaluate each sample 47 to 64. The results of the measurement are shown In Table 7 along with the substrate temperatures and the argon gas pressures.

Like in Table 1, the differences $d_{(002)}$–$d_{(110)}$ of the crystal lattice plane distances between the first magnetic film 31 and the third thin film 2c are substantially equal to the differences $d_{(002)}$–$d_{(110)}$ of the crystal lattice plane distances between the second magnetic film 32 and the nonmagnetic intermediate film 33 because the third thin films 2c and the nonmagnetic intermediate films 33 were deposited under the same conditions as each other and the first and the second magnetic films 31 and 32 were also deposited under the same conditions as each other. In this connection, single values alone are shown as the differences $d_{(002)}$–$d_{(110)}$ in the forty-seventh through the sixty-fourth samples 47 to 64 shown in Table 7.

As shown in Table 7, the forty-seventh through the fifty-sixth samples 47 to 56 can accomplish high coercive force (Hc) and high S/N ratios by using the third thin films 2c and the nonmagnetic intermediate films 33 each of which consists of the CrV alloys including 10–20 at. % of V when each of the first and the second magnetic films 31 and 32 of CoPtCr comprises 60–90 at. % of Co, 4–20 at. % of Pt, and 3–30 at. % of Cr.

Furthermore, it is preferable that each of the first and the second magnetic films 31 and 32 comprises 64–84 at. % of Co, 5–18 at. % of Pt, and 5–25 at. % of Cr so as to obtain the high coercive force (Hc) and the high S/N ratio.

When each of the first and the second magnetic films 31 and 32 is formed by the CoPtTa alloys, as shown in the fifty-seventh through the sixtieth samples 57 to 60, high coercive force (Hc) and high S/N ratios can be accomplished by inclusion of 80–90 at. % of Co, 5–15 at. % of Pt, and 1–7 at. % of Cr.

In addition, when each of the first and the second magnetic films 31 and 32 is formed by CoPtCrTa alloys, as listed in the sixty-first through the sixty-fourth samples 61 to 64, high coercive force (Hc) and high S/N ratios can be achieved by inclusion of 70-80 at-% of Co, 5–15 at. % of Pt, 5–25 at. % of Cr, and 1–7 at. % of Ta.

Overwriting (OW) Property Tests:

Evaluation has been conducted as regards overwriting (OW) properties (dB) of the first through the sixty-fourth samples 1 to 64 in a manner to be described below.

At first, write-in operation Is carried out at a frequency of 3.4 MHz and is assumed to cause an output V1 to occur at a first stage. The overwriting (OW) operation is conducted at a frequency of 13.5 MHz at a second stage. After the overwriting operation, an output V2 is detected which is written at the frequency of 3.4 MHz during the first stage. The overwriting property (OW) is given by:

OW (dB)=20 log(V2/V1).

During the overwriting property tests, the MR head used for testing the first sample 1 was also used to evaluate the overwriting property with the same floating height.

In order to evaluate the overwriting properties, the fifth sample 5 was modified into sixty-fifth through sixty-seventh samples 65 to 67 by changing the thicknesses of each of the first and the second magnetic films 31 and 32, the third thin film 2c, and the nonmagnetic intermediate film 33, as shown in Table 8. Likewise, the eleventh sample 11 was modified into sixty-eighth through seventieth samples 68 to 70 by changing the thicknesses of each of the first and the second magnetic films 31 and 32 the third thin film 2c, and the nonmagnetic intermediate film 33.

Similar modification was made about the first comparative sample 1 so as to seventh through twelfth comparative samples 7 to 12.

The overwriting (OW) properties were evaluated at each sample listed in Table 8 and were represented by saturation values, as shown in Table 8. This is because the overwriting properties tend to be saturated with an increase of a write-in current.

TABLE 8

| Sample | Magnetic Film (31 & 32) Composition (at %) | Thickness (Å) | 3rd Thin Film (2c) Composition (at %) | Thickness (Å) | Nonmagnetic Intermediate Film (33) Composition (at %) | Thickness (Å) | Overwriting (OW) (dB) |
|---|---|---|---|---|---|---|---|
| 5 | $Co_{78}Pt_{11}Cr_{11}$ | 120 | $Cr_{90}V_{10}$ | 50 | $Cr_{90}V_{10}$ | 50 | −42.3 |
| 65 | " | 230 | " | 50 | " | 50 | −38.5 |
| 66 | " | 120 | " | 150 | " | 50 | −39.0 |
| 67 | " | 120 | " | 50 | " | 100 | −38.0 |
| 11 | " | 120 | $Cr_{80}V_{20}$ | 50 | $Cr_{80}V_{20}$ | 50 | −41.3 |
| 68 | " | 230 | " | 50 | " | 50 | −38.5 |
| 69 | " | 120 | " | 150 | " | 50 | −38.8 |

TABLE 8-continued

|  | Magnetic Film (31 & 32) | | 3rd Thin Film (2c) | | Nonmagnetic Intermediate Film (33) | | Over- |
| --- | --- | --- | --- | --- | --- | --- | --- |
|  | Composition (at %) | Thickness (Å) | Composition (at %) | Thickness (Å) | Composition (at %) | Thickness (Å) | Writing (OW) (dB) |
| 70 Comparative Sample | " | 120 | " | 50 | " | 100 | −38.0 |
| 1 | $Co_{78}Pt_{11}Cr_{11}$ | 120 | Cr | 50 | Cr | 50 | −36.3 |
| 7 | " | 270 | $Cr_{90}V_{10}$ | 50 | $Cr_{90}V_{10}$ | 50 | −36.5 |
| 8 | " | 120 | " | 200 | " | 50 | −36.8 |
| 9 | " | 120 | " | 50 | " | 150 | −32.1 |
| 10 | " | 270 | $Cr_{80}V_{20}$ | 50 | $Cr_{80}V_{20}$ | 50 | −36.0 |
| 11 | " | 120 | " | 200 | " | 50 | −36.5 |
| 12 | " | 120 | " | 50 | " | 150 | −32.0 |

As readily understood from Table 8, the fifth, the eleventh, and the sixty-fifty through the seventieth samples 5, 11, 65 to 70 each of which includes the films of CrV are very excellent in the overwriting (OW) properties in comparison with the first sample 1.

Moreover, it has been found out from Table 8 that the overwriting properties are widely changed in dependency upon the thicknesses of each magnetic film, the third thin film 2c, and the nonmagnetic intermediate film 33. In order to accomplish the overwriting properties less than −38 dB, it is preferable that each of the first and the second magnetic films 31 and 32 has a thickness of less than 230 angstroms while the third thin film 2c and the nonmagnetic intermediate film 33 are equal to or less than 150 and 100 angstroms, respectively. More preferably, the magnetic films 31 and 32, the third thin film 2c, and the nonmagnetic intermediate film 33 are equal to or less than 150, 100, and 80 angstroms, respectively.

According to the second embodiment of the present invention, the magnetic recording medium has excellent static magnetic properties, such as coercive force, the product of residual magnetization and thickness, and excellent recording and reproducing properties, such as S/N ratios and OW property. As a result, it is possible to obtain a large output with a small medium noise even when the recording and reproducing operation is carried out at a surface recording density not less than 600 Mb/in$^2$.

While the present invention has thus far been described in conjunction with a few embodiments thereof, it will be readily possible for those skilled in the art to put the present invention into practice in various other manners. For example, when each magnetic film in the first and the second embodiments is formed by CoPtCrTa, it may preferably include 1–18 at. % of Cr, 1–15 at. % of Pt, 1–8 at. % of Ta, and the balance formed by Co. In addition, each magnetic film may be, for example, a film which includes an oxide (for instance, yttrium oxide and/or the like) in addition to Co and Pt, or which includes a magnetic material or magnetic materials dispersed within oxide or oxides. The substrate 1 may be formed by a nonmagnetic material and may be, for example, a crystallized glass substrate, an aluminum substrate, a ceramic substrate, a carbon substrate, a silicon substrate, or the like. The first protection film 4a may be, for example, a silicon oxide film, a carbon film, a zirconia film, a carbon hydride film, a silicon nitride film, a SiC film. In addition, the second protection film 4b may be, for example, a carbon film deposited on the first protection film by sputtering.

Herein, it is noted that the silicon oxide film which is laid on the substrate serves as a texturing film which has undulation and which is effective to avoid stiction of a magnetic head. Such a texturing film may be either an aluminum film or an AlN film.

As regards the magnetic film according to the first embodiment, it is preferable that a total amount of Co and Pt is equal to or greater than 70 at. % in consideration of the coercive force (Hc). A ratio of Pt(at. %)/Co(at. %) desirably falls within a range between 0.07 and 0.2. In addition to Co and Pt, the magnetic film may include at least one of Cr, Ta, Ni, Si, B, O, N, Nb, Mn, Mo, Zn, W, Pb, Re, V, Sm, and Zr as an additional component. The amount of the additional component may be decided in consideration of the magnetic properties but may not preferably exceed 30 at. %. For example, the magnetic film may be formed by a CoPtCr alloy, a CoPtCrTa alloy, a CoPtCrNi alloy, or the like. The thickness of the magnetic film may be between 400 and 550 angstroms in view of the output, the overwriting property, and the noise. When the thickness of the magnetic film is less than 400 angstroms, a sufficient output might not be obtained while the noise tends to increase when the thickness of the magnetic film exceeds 550 angstroms.

Moreover, the underlayer 2 may include at least one film of CrV which includes less than 50 at. % of V. This is because the underlayer 2 is formed by particles of a uniform size and has good crystallization. Instead of a part of V, at least one of Zr, W, B, Mo, Nb, Ta, Pe, Ni, Re, Ce, Zn, P, Si, Ga, Hf, Al, Ti may be added to the magnetic film as a subsidiary component. In this case, it is desirable that a sum amount of V and the subsidiary component does not exceed 50 at. % so as to improve the particle size and crystallization. It is preferable that the thickness of the underlayer falls within the range between 10 and 150 angstroms to provide a pertinent crystal lattice plane distance between (110) planes. More preferably, the thickness of the underlayer is between 20 and 100 angstroms. When the CrVZr alloy is used for the underlayer or the third thin film 2c which includes Cr and V, the S/N ratio is improved by addition of Zr to the Crv alloy because the addition of Zr is effective to reduce the noise. The amount of Zr preferably falls within the range between 2 and 5 at. %. Further, the CrVZr alloy may have the thickness between 10 and 150 angstroms, preferably, between 20 and 100 angstroms. This is because the coercive force becomes insufficient when the thickness is less than 10 angstroms while reductions of the output and the overwriting property take place with an increase of the noise when the thickness of the CrVZr exceeds 150 angstroms.

As regards the second embodiment of the present invention, most of the facts mentioned above apply to the second embodiment. In addition, the lamina 3a may include more than two magnetic films, namely, three, four, or five magnetic films. In this event, the nonmagnetic intermediate film or films interposed between two adjacent ones of the magnetic films include at least one nonmagnetic intermediate film of CrV. The lamina 3a may be structured by a combination of μmagnetic film-a nonmagnetic film-a magnetic film, a combination of a magnetic film-a nonmagnetic film-a magnetic film-a nonmagnetic film-a magnetic film, or a combination of a magnetic film-a nonmagnetic film-a magnetic film-a nonmagnetic film-a magnetic film-a nonmagnetic film-a magnetic film. The magnetic films may have compositions and materials which are identical with one another or which are different from one another. This is true of the plurality of the nonmagnetic films.

Each of the magnetic films may have a thickness between 20 and 230 angstroms, preferably, between 40 and 150 angstroms. Less than 20 angstroms of the magnetic film makes the coercivity insufficient while more than 230 angstroms of the magnetic film makes the medium noise increase. Each of the nonmagnetic films may have a thickness between 10 and 100 angstroms, preferably, between 30 and 80 angstroms. This is because less than 10 angstroms of the nonmagnetic film reduces the coercivity while more than 100 angstroms of the nonmagnetic film brings about a reduction of the reproduction output, degradation of the overwriting property, and an increase of the medium noise.

What is claimed is:

1. A magnetic recording medium comprising:
   a magnetic film which includes at least Co and Pt and which is specified by a hexagonal close-packed (hcp) crystal structure having (002) planes remote from each other by a first crystal lattice plane distance $d_{(002)}$;
   an underlying film which includes Cr and V, which is contacted with the magnetic film, and which is specified by a body-centered cubic (bcc) crystal structure having (110) planes distant from each other by a second crystal lattice plane distance $d_{(110)}$;
   the magnetic film and the underlying film being specified by a difference between the first crystal lattice plane distance $d_{(002)}$ and the second crystal lattice plane distance $d_{(110)}$, the difference being given by subtracting the second crystal lattice plane distance $d_{(110)}$ from the first crystal lattice plane distance $d_{(002)}$ and falling within a range between 0.002 and 0.032 angstrom.

2. A magnetic recording medium as claimed in claim 1, further comprising:
   a substrate which underlies the underlying film and which is directly contacted with the underlying film.

3. A magnetic recording medium as claimed in claim 1, further comprising:
   at least one subsidiary underlying film which underlies the underlying film and which is brought into contact with the underlying film; and
   a substrate kept in contact with the at least one subsidiary underlying film.

4. A magnetic recording medium as claimed in claim 3, wherein the at least one subsidiary underlying film is composed of a nonmagnetic material which has a body-centered and close-packed crystal structure.

5. A magnetic recording medium as claimed in claim 4, wherein the nonmagnetic material is formed by a metal selected from a group consisting of Cr, Ti, Ta, and Zr.

6. A magnetic recording medium as claimed in claim 1, wherein the magnetic film is composed of a CoPtCr alloy.

7. A magnetic recording medium as claimed in claim 6, wherein the CoPtCr alloy comprises 60–90 at. % of Co, 4–20 at. % of Pt, and 3–30 at. % of Cr.

8. A magnetic recording medium as claimed in claim 1, wherein the difference falls within the range between 0.014 and 0.030 angstrom.

9. A magnetic recording medium as claimed in claim 1, wherein the underlying film is composed of a CrVZr alloy.

10. A magnetic recording medium as claimed in claim 9, wherein the CrVZr alloy comprises 2–5 at. % of Zr.

11. A magnetic recording medium as claimed in claim 9, wherein the underlying film of the CrVZr alloy has a thickness between 10 and 150 angstroms.

12. A magnetic recording medium comprising a substrate, an underlying layer of a nonmagnetic material, and a lamina on the underlying layer, said lamina comprising:
    a first magnetic film which is brought into contact with the underlying layer, which includes Co and Pt as primary components;
    a nonmagnetic intermediate film which is deposited on the first magnetic film, which includes Cr and V, and which is specified by a body-centered cubic (bcc) crystal structure having (110) planes distant from each other by a crystal lattice plane distance $d_{(110)}$, and
    a second magnetic film which is deposited on the nonmagnetic intermediate film, which includes Co and Pt, and which is specified by a hexagonal close-packed (hcp) crystal structure having (002) planes remote from each other by a crystal lattice plane distance $d_{(002)}$;
    the second magnetic film and the nonmagnetic intermediate film being specified by a difference between the crystal lattice plane distance $d_{(002)}$ and the crystal lattice plane distance $d_{(110)}$, the difference being given by subtracting the crystal lattice plane distance $d_{(110)}$ from the crystal lattice plane distance $d_{(002)}$ and falling within a range between 0.002 and 0.032 angstrom.

13. A magnetic recording medium as claimed in claim 12, wherein the first magnetic film includes Co and Pt and is also specified by a hexagonal close-packed (hcp) crystal structure having (002) planes remote from each other by an additional crystal lattice plane distance $d_{(002)}$.

14. A magnetic recording medium as claimed in claim 13, wherein the underlying layer comprises:
    an uppermost thin film which is brought into contact with the first magnetic film, which includes Cr and V, and which is specified by a body-centered cubic (bcc) crystal structure having (110) planes distant from each other by a subsidiary crystal lattice plane distance $d_{(110)}$;
    the first magnetic film and the uppermost thin film being specified by an additional difference between the additional crystal lattice plane distance $d_{(002)}$ and the subsidiary crystal lattice plane distance $d_{(110)}$, the difference being given by by subtracting the subsidiary crystal lattice plane distance $d_{(110)}$ from the additional crystal lattice plane distance $d_{(002)}$ and falling within a range between 0.002 and 0.032 angstrom.

15. A magnetic recording medium as claimed in claim 14, wherein the additional difference between the additional crystal lattice plane distance $d_{(002)}$ and the subsidiary crystal lattice plane distance $d_{(110)}$ falls within the range between 0.014 and 0.030 angstrom.

16. A magnetic recording medium as claimed in claim 14, wherein the underlying layer further comprises:
    an additional thin film which is situated under the uppermost thin film, which is brought into contact with the uppermost thin film, and which is composed of a nonmagnetic material of a body centered and close-packed crystal structure.

17. A magnetic recording medium as claimed in claim 16, wherein the nonmagnetic material of the additional thin film is composed of a metal which has the body centered and close-packed crystal structure.

18. A magnetic recording medium as claimed in claim 17, wherein the metal is selected from a group consisting of Cr, Ti, Ta, and Zr.

19. A magnetic recording medium as claimed in claim 12, wherein the difference between $d_{(002)}$ and $d_{(110)}$ falls within the a range between 0.014 and 0.030 angstrom.

20. A magnetic recording medium comprising a substrate, an underlying layer of a nonmagnetic material, and a lamina on the underlying layer, said lamina comprising:

a plurality of magnetic films each of which includes Co and Pt and which has a hexagonal close-packed (hcp) crystal structure having (002) planes remote from each other by a first crystal lattice plane distance $d_{(002)}$;

a plurality of nonmagnetic intermediate films each of which is interposed between two adjacent ones of the magnetic films, which includes Cr and V, and which is specified by a body-centered cubic (bcc) crystal structure having (110) planes distant from each other by a second crystal lattice intermediate distance $d_{(110)}$;

the first and the second lattice plane distances $d_{(002)}$ and $d_{(110)}$ having a difference between 0.002 and 0.032 angstrom.

21. A magnetic recording medium as claimed in claim 20, wherein the difference falls within a range between 0.014 and 0.030 angstrom.

22. A magnetic recording medium as claimed in claim 20, wherein the underlying layer comprises:

an uppermost thin film which is brought into contact with a lowermost one of the magnetic films, which includes Cr and V, and which is specified by a body-centered cubic (bcc) crystal structure having (110) planes distant from each other by a subsidiary crystal lattice plane distance $d_{(110)}$;

the lowermost one of the magnetic films and the uppermost thin film being specified by an additional difference between the first crystal lattice plane distance $d_{(002)}$ and the subsidiary crystal lattice plane distance $d_{(110)}$, the difference being given by subtracting the subsidiary crystal lattice plane distance $d_{(110)}$ from the additional crystal lattice plane distance $d_{(002)}$ and falling within a range between 0.002 and 0.032 angstrom.

23. A magnetic recording medium as claimed in claim 22, wherein the difference between $d_{(002)}$ and $d_{(110)}$ falls within the a range between 0.014 and 0.030 angstrom.

24. A magnetic recording medium as claimed in claim 22, wherein the underlying layer further comprises:

an additional thin film which is situated under the uppermost thin film and which is composed of a nonmagnetic material which has a body centered and close-packed crystal structure.

25. A magnetic recording medium as claimed in claim 24, wherein the nonmagnetic material is selected from a group consisting of Cr, Ti, Ta, and Zr.

26. A magnetic recording medium as claimed in claim 20, wherein a selected one of the magnetic films is formed by a CoPtCr alloy.

27. A magnetic recording medium as claimed in claim 26, wherein the CoPtCr alloy comprises 60–90 at. % of Co, 4–20 at% of Pt, and 3–30 at. % of Cr.

* * * * *